(12) United States Patent
Leather et al.

(10) Patent No.: US 6,999,100 B1
(45) Date of Patent: Feb. 14, 2006

(54) METHOD AND APPARATUS FOR ANTI-ALIASING IN A GRAPHICS SYSTEM

(75) Inventors: Mark M. Leather, Saratoga, CA (US); Farhad Fouladi, Los Altos Hills, CA (US)

(73) Assignee: Nintendo Co., Ltd., Kyoto (JP)

( * ) Notice: Subject to any disclaimer, the term of this patent is extended or adjusted under 35 U.S.C. 154(b) by 466 days.

(21) Appl. No.: 09/726,226

(22) Filed: Nov. 28, 2000

Related U.S. Application Data

(60) Provisional application No. 60/226,900, filed on Aug. 23, 2000.

(51) Int. Cl.
*G09G 5/00* (2006.01)

(52) U.S. Cl. ........................................ 345/611; 345/613

(58) Field of Classification Search ................ 345/589, 345/419, 698, 613, 611, 614, 615; 382/266, 382/269
See application file for complete search history.

(56) References Cited

U.S. PATENT DOCUMENTS

| | | |
|---|---|---|
| 4,388,620 A | 6/1983 | Sherman |
| 4,425,559 A | 1/1984 | Sherman |
| 4,463,380 A | 7/1984 | Hooks, Jr. |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,897,806 A | 1/1990 | Cook et al. |

(Continued)

FOREIGN PATENT DOCUMENTS

CA  2070934  12/1993

(Continued)

OTHER PUBLICATIONS

Akeley, Kurt, "Reality Engine Graphics", 1993, Silicon Graphics Computer Systems, pp. 109-116.*

(Continued)

*Primary Examiner*—Matthew Luu
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The system achieves highly efficient full-scene anti-aliasing by implementing a programmable-location super-sampling arrangement and using a selectable-weight vertical-pixel support area blending filter. For a 2×2 pixel group (quad), the locations of three samples within each super-sampled pixel are individually selectable. A twelve-bit multi-sample coverage mask is used to determine which of twelve samples within a pixel quad are enabled based on the portions of each pixel occupied by a primitive fragment and any pre-computed z-buffering. Each super-sampled pixel is filtered during a copy-out operation from a local memory to an external frame buffer using a pixel blending filter arrangement that combines seven samples from three vertically arranged pixels. Three samples are taken from the current pixel, two samples are taken from a pixel immediately above the current pixel and two samples are taken from a pixel immediately below the current pixel. A weighted average is then computed based on the enabled samples to determine the final color for the pixel. The weight coefficients used in the blending filter are also individually programmable. De-flickering of thin one-pixel tall horizontal lines for interlaced video displays is also accomplished by using the pixel blending filter to blend color samples from pixels in alternate scan lines.

5 Claims, 18 Drawing Sheets

(Example Vertical Filter Structure)

U.S. PATENT DOCUMENTS

| | | |
|---|---|---|
| 4,901,064 A | 2/1990 | Deering |
| 4,914,729 A | 4/1990 | Omori et al. |
| 4,945,500 A | 7/1990 | Deering |
| 5,136,664 A | 8/1992 | Bersack et al. |
| 5,170,468 A | 12/1992 | Shah et al. |
| 5,239,624 A | 8/1993 | Cook et al. |
| 5,268,996 A | 12/1993 | Steiner et al. |
| 5,357,579 A | 10/1994 | Buchner et al. |
| 5,361,386 A | 11/1994 | Watkins et al. |
| 5,363,475 A | 11/1994 | Baker et al. |
| 5,392,385 A | 2/1995 | Evangelisti et al. |
| 5,392,393 A | 2/1995 | Deering |
| 5,394,516 A | 2/1995 | Winser |
| 5,412,796 A | 5/1995 | Olive |
| 5,421,028 A | 5/1995 | Swanson |
| 5,432,895 A | 7/1995 | Myers |
| 5,457,775 A | 10/1995 | Johnson, Jr. et al. |
| 5,504,917 A | 4/1996 | Austin |
| 5,535,374 A | 7/1996 | Olive |
| 5,594,854 A | 1/1997 | Baldwin et al. |
| 5,600,763 A | 2/1997 | Greene et al. |
| 5,608,424 A | 3/1997 | Takahashi et al. |
| 5,651,104 A | 7/1997 | Cosman |
| 5,684,939 A | 11/1997 | Foran et al. |
| 5,687,357 A | 11/1997 | Priem |
| 5,701,444 A | 12/1997 | Baldwin |
| 5,721,947 A | 2/1998 | Priem et al. |
| 5,724,561 A | 3/1998 | Tarolli et al. |
| 5,727,192 A | 3/1998 | Baldwin |
| 5,758,182 A | 5/1998 | Rosenthal et al. |
| 5,764,228 A | 6/1998 | Baldwin |
| 5,764,243 A | 6/1998 | Baldwin |
| 5,768,626 A | 6/1998 | Munson et al. |
| 5,768,629 A | 6/1998 | Wise et al. |
| 5,774,133 A | 6/1998 | Neave et al. |
| 5,777,629 A | 7/1998 | Baldwin |
| 5,798,770 A | 8/1998 | Baldwin |
| 5,801,706 A | 9/1998 | Fujita et al. |
| 5,801,716 A | 9/1998 | Silverbrook |
| 5,805,868 A | 9/1998 | Murphy |
| 5,815,166 A | 9/1998 | Baldwin |
| 5,818,456 A | 10/1998 | Cosman et al. |
| 5,821,949 A | 10/1998 | Deering |
| 5,835,096 A | 11/1998 | Baldwin |
| 5,859,645 A | 1/1999 | Latham |
| 5,874,969 A | 2/1999 | Storm et al. |
| 5,877,771 A | 3/1999 | Drebin et al. |
| 5,886,701 A | 3/1999 | Chauvin et al. |
| 5,917,496 A | 6/1999 | Fujita et al. |
| 5,920,326 A | 7/1999 | Rentschler et al. |
| 5,940,086 A | 8/1999 | Rentschler et al. |
| 5,943,060 A | 8/1999 | Cosman et al. |
| 5,949,424 A | 9/1999 | Cabral et al. |
| 5,949,428 A | 9/1999 | Toelle et al. |
| 5,949,440 A | 9/1999 | Krech, Jr. et al. |
| 5,969,726 A | 10/1999 | Rentschler et al. |
| 5,977,984 A | 11/1999 | Omori |
| 5,990,903 A | 11/1999 | Donovan |
| 5,999,196 A | 12/1999 | Storm et al. |
| 6,002,409 A | 12/1999 | Harkin |
| 6,005,582 A | 12/1999 | Gabriel et al. |
| 6,023,738 A | 2/2000 | Priem et al. |
| 6,025,853 A | 2/2000 | Baldwin |
| 6,028,608 A | 2/2000 | Jenkins |
| 6,028,611 A | 2/2000 | Anderson et al. |
| 6,037,949 A | 3/2000 | DeRose et al. |
| 6,038,031 A | 3/2000 | Murphy |
| 6,057,852 A | 5/2000 | Krech, Jr. |
| 6,064,392 A | 5/2000 | Rohner |
| 6,072,500 A | 6/2000 | Foran et al. |
| 6,092,124 A | 7/2000 | Priem et al. |
| 6,130,723 A * | 10/2000 | Medin ........................ 348/609 |
| 6,173,367 B1 | 1/2001 | Aleksic et al. |
| 6,181,352 B1 | 1/2001 | Kirk et al. |
| 6,198,488 B1 | 3/2001 | Lindholm et al. |
| 6,226,012 B1 | 5/2001 | Priem et al. |
| 6,469,707 B1 * | 10/2002 | Voorhies ..................... 345/589 |
| 6,496,187 B1 * | 12/2002 | Deering et al. ............. 345/419 |
| 6,597,363 B1 | 7/2003 | Duluk et al. |

FOREIGN PATENT DOCUMENTS

| | | |
|---|---|---|
| EP | 1 074 945 | 2/2001 |
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whiepaper: "Z Buffering, Interpolation and More W-Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Song PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Lastest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, © 1999.

Nikkei Shimbun, "Sony Making SME, Chemical and SPT into Wholly-Owned Subsidaries", Mar, 9, 1999.

AM New: Japanese Developers Not All Sold on PS2, Next Generation, Mar. 16, 1999.

Sony To Turn PlayStation Maker Into Wholly Owned Unit-Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Conroversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating-Point MAC's 4 Floating-Point Dividers, and an MPEG2 Decoder, 1999 IEEE International Solid-State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug., 19, 2000, www.hexus.net.

Microsoft Xbox—The Future of Gaming, Microsoft Xbox Performance Sheet, www.xbox.com.

Robert L. Cook, "Shade Trees",Computer Graphics, vol. 18, No. 3, Jul. 1984.

Wang et al., "Second-Depth Shadow Mapping", Department of Computer Science, Univ. N.C., Chapel Hill, N.C. pp. 1-7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994, pp. 433-437.

James F. Blinn, "Simulationof Wrinkled Surfaces," Caltech/JPL, pp. 286-292, SIGGRAPH 78 (1978).

Tomas Möller and Eric Haines "Real-Time Rendering", AK Peters, Ltd., ©1999, pp. 127-142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump-mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump-mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000, www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per-Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1998.

The RenderMan Interface, Version 3.2, Pixar Animation Studios, Jul. 2000, www.pixar.com.

NVIDIA Product Overview, "GeForceUltra", NVIDIA Corporation, Aug. 21, 2000, www.nvidia.com.

Duke, "Dreamcast Technical Specs", Sega Dreamcast Review, Sega, Feb. 1999, www.game-revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation, 1995-1999 (as part of the Directx 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Offical Guide to Learning OpenGL, Release 1", Jackie Nieder, Tom David, Mason Woo, Addision-Wesley Publishing Co., 1993.

"Procedural Elements for Computer Graphics," Second Edition, David F. Rogers, McGraw Hill, 1998.

"Real-Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three-Dimensional Computer Animation", Revised Edition, Michael O'Rourke, W.W. Norton & Company, 1998.

* cited by examiner

Fig. 5  EXAMPLE GRAPHICS PROCESSOR FLOW

Example
anti-aliasing process

Example FSAA method flowchart (Primitive and super-sampled piexel quad)

(Sampling pattern)

Fig. 9 (Super-sample locations in units of 1/12 pixel)

Fig. 10 (Preferred sampling pattern)

Fig. 11 (Programmable control registers for setting sample locations & filter coefficients)

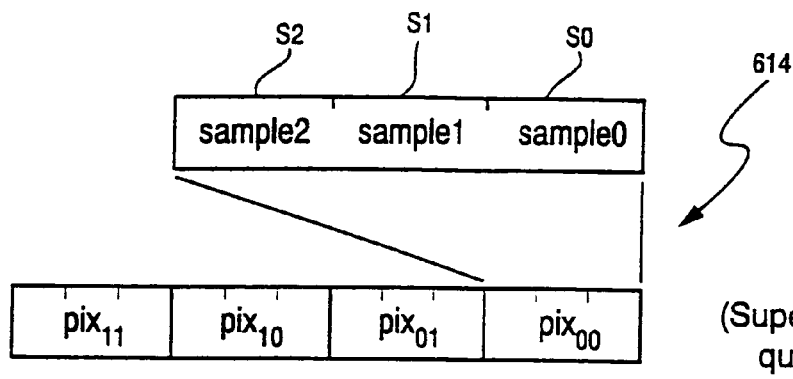
Fig. 12
(Super-sampling for current quad-coverage mask)
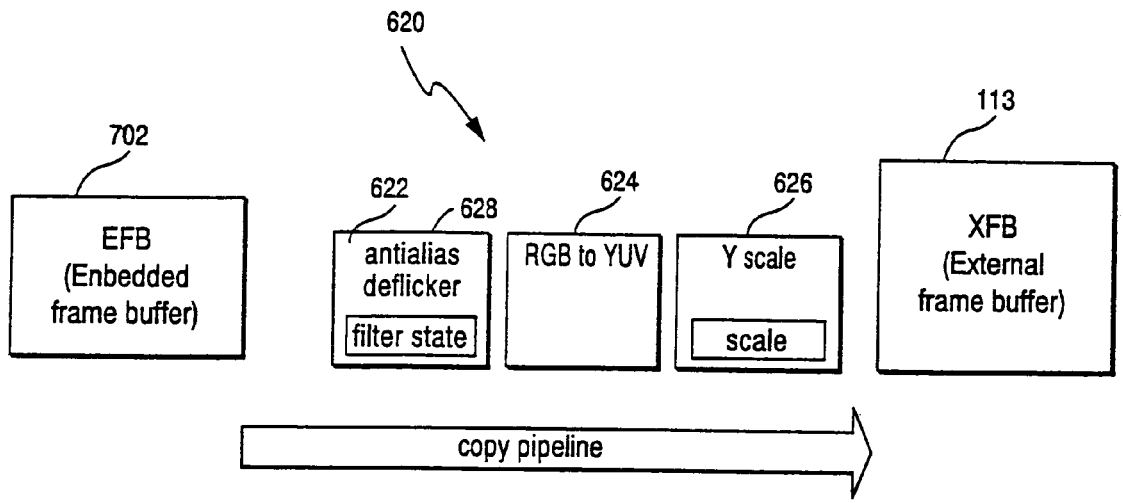
Fig. 13 (Copy-out pipeline)
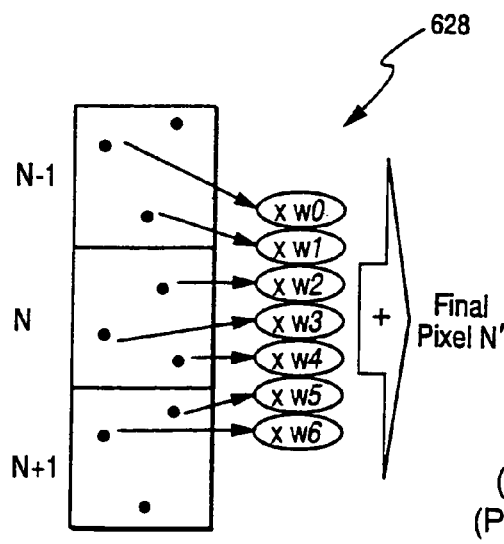
Fig. 14
(Vertical Filter Blending)
(Programmable 7-tap filter)

Example vertical filter aperture

Example AA copy out buffering (Example Vertical Filter Structure)

(AA buffering)

Example de-flickering filter (De-flicker buffering)

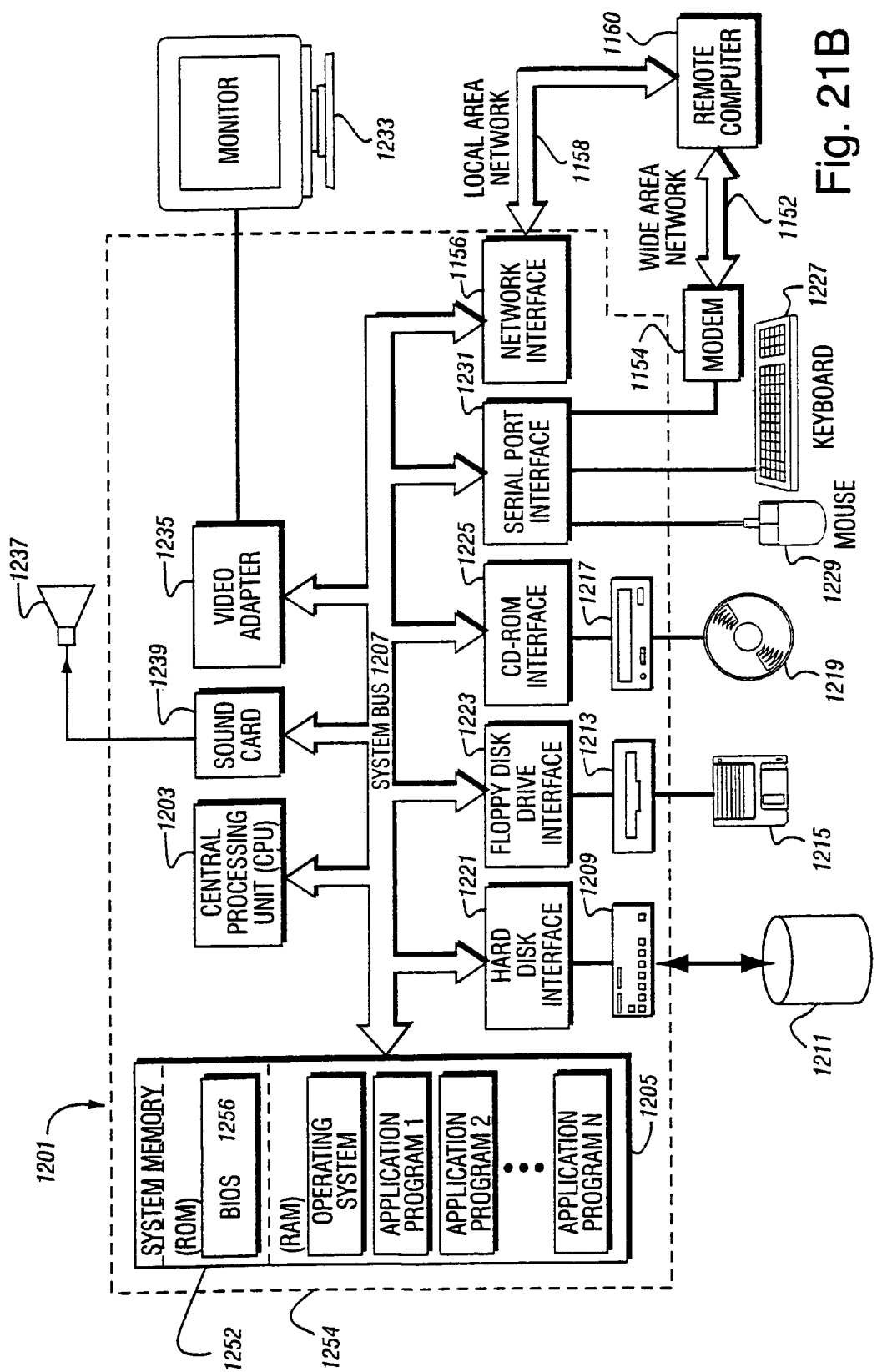

METHOD AND APPARATUS FOR ANTI-ALIASING IN A GRAPHICS SYSTEM

CROSS-REFERENCE TO RELATED APPLICATIONS

This application is filed in accordance with 35 U.S.C. § 119(e)(1) and claims the benefit of the provisional application Ser. No. 60/226,900 filed on Aug. 23, 2000, entitled "Method And Apparatus For Anti-Aliasing In A Graphics System."

This application is related to the following co-pending applications identified below (by title and attorney docket number), which focus on various aspects of the graphics system described herein. Each of the following applications are hereby incorporated herein by reference.

provisional Application No. 60/161,915, filed Oct. 28, 1999 and its corresponding utility application Ser. No. 09/465,754, filed Dec. 17, 1999, both entitled "Vertex Cache For 3D Computer Graphics", provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System", provisional Application No. 60/226,889, filed Aug. 23, 2000 and its corresponding utility application Ser. No. 09/722,419, filed Nov. 28, 2000, both entitled "Graphics Pipeline Token Synchronization", provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System", provisional Application No. 60/226,888, filed Aug. 23, 2000 and its corresponding utility application Ser. No. 09/722,367, filed Nov. 28, 2000, both entitled "Recirculating Shade Tree Blender For A Graphics System", provisional Application No. 60/226,892, filed Aug. 23, 2000 and its corresponding utility application Ser. No. 09/726,218, filed Nov. 28, 2000, both entitled "Method And Apparatus For Efficient Generation Of Texture Coordinate Displacements For Implementing Emboss-Style Bump Mapping In A Graphics Rendering System", provisional Application No. 60/226,893, filed Aug. 23, 2000 and its corresponding utility application Ser. No. 09/722,381 filed Nov. 28, 2000, both entitled "Method And Apparatus For Environment-Mapped Bump-Mapping In A Graphics System", provisional Application No. 60/227,007, filed Aug. 23, 2000 and its corresponding utility application Ser. No. 09/726,216, filed Nov. 28, 2000, both entitled "Achromatic Lighting in a Graphics System and Method", provisional Application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats", utility application Ser. No. 09/585,329, filed Jun. 2, 2000, entitled "Variable Bit Field Color Encoding", provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode", provisional Application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System", provisional Application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System", provisional Application No. 60/226,885, filed Aug. 23, 2000 and its corresponding utility application Ser. No. 09/722,664, filed Nov. 28, 2000, both entitled "Controller Interface For A Graphics System", provisional Application No. 60/227,033, filed Aug. 23, 2000 and its corresponding utility application Ser. No. 09/726,221, filed Nov. 28, 2000, both entitled "Method And Apparatus For Texture Tiling In A Graphics System", provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory", provisional Application No. 60/226,913, filed Aug. 23, 2000 and its corresponding utility application Ser. No. 09/722,378, filed Nov. 28, 2000, both entitled "Z-Texturing", provisional Application No. 60/227,031, filed Aug. 23, 2000 entitled "Application Program Interface for a Graphics System", provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory", provisional Application No. 60/226,886, filed Aug. 23, 2000 and its corresponding utility application Ser. No. 09/722,665, filed Nov. 28, 2000, both entitled "Method and Apparatus for Accessing Shared Resources", provisional Application No. 60/226,894, filed Aug. 23, 2000 and its corresponding utility application Ser. No. 09/726,220, filed Nov. 28, 2000, both entitled "Graphics Processing System With Enhanced Memory Controller", provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional Application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. In more detail, the invention relates to anti-aliasing techniques for eliminating jagged edges from a computer graphics display. Still more particularly this invention relates to an improved method and apparatus for full-scene anti-aliasing and de-flickering in a graphics system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past is how to avoid bad visual effects associated with aliasing in a displayed image. Most modern computer graphics display devices create images by displaying an array of colored dots called pixels. Home color television sets and computer monitors work this way. When displaying graphics images on this kind of pixelated display, a staircasing effect can result due to the inherent characteristics of the graphics system and the display. Because the displayed digital image is made up of an array or grid of tiny pixels, edges of objects in the image may look jagged or stepped. For example, a smooth edge may appear as a stepped or jagged line due to the pixel grid. People refer to this stepped or jagged edge effect as "the jaggies" or "staircasing"—but its technical name is "aliasing".

Aliasing is an inherent feature of a sampling based system. An unpleasant image can result when jaggies exist along edges and intersections of rendered primitives. Moreover, other visually disturbing side-effects of aliasing such as texture "swimming" or "flickering" can result throughout the entire rendered scene. These annoying side-effects are most often noticeable during animation.

Much work has been done in the past to solve the aliasing problem. More expensive graphics systems use "anti-aliasing" techniques that reduce or eliminate the visual effects of aliasing. One common anti-aliasing technique is based on a super-sampling/postfiltering approach. Using this approach, the graphics system develops a sampled image that has more samples (sub-pixels) than the display device is capable of displaying. The graphics system filters the higher-resolution sampled image and resamples the image at the resolution of the display device. In simple terms, the graphics system intentionally coarsens the resolution of the sampled image before displaying it on the display device. In one example, the graphics system might generate a certain number of sub-pixels for a pixel to be displayed on the screen, and blend the sub-pixels together to create the corresponding screen pixel.

Such anti-aliasing techniques improve the appearance of the image by reducing jaggies. The blurring or blending of pixels smoothes out edges—even though the image is still made up of discrete pixels—because it provides a more gradual change in the pixel color pattern. As a result, the eye of the viewer perceives the edge as being much smoother and more accurate as compared to an aliased edge. It is not exactly intuitive that blurring could make the edge appear to be more accurate and realistic, but this is exactly how commonly used anti-aliasing techniques work.

Unfortunately, however, the super-sampling anti-aliasing approach described above requires a substantial amount of memory and other resources. For example, storing n sub-pixels for each screen pixel requires a memory that is n times the size of what would otherwise be required. In addition, generating n sub-pixels for each screen pixel requires the graphics pipeline to do a lot of extra work. Also, the blending operation can be very burdensome and can require additional circuitry or other processing resources. Consequently, such super-sampling approaches to anti-aliasing have typically been found in the past in expensive graphics systems such as high end workstations but have been too "expensive" (in terms of required processing and memory resources) for use in low cost systems such as video game platforms.

Another anti-aliasing technique that has been used in the past involved the use of coverage values to reduce computational complexity and memory requirements. Such technique is described in U.S. Pat. No. 5,742,277. This technique provides a method of anti-aliasing a silhouette edge by retrieving a color value for a silhouette edge pixel which falls on the silhouette edge from a frame buffer, the retrieved color value representing a color of one or more foreground polygons which fall within the silhouette edge pixel. The technique estimates a background color of the silhouette edge pixel based on colors of neighboring pixels that are proximate to the silhouette edge pixel. This estimated background color represents a color of a portion of the silhouette edge pixel which is not occupied by the one or more foreground polygons. An output color of the silhouette edge pixel is determined by interpolating between the retrieved color and the estimated background color. While this anti-aliasing technique can reduce jaggies in the rendered scene, the required estimation step has distinct disadvantages in terms of accuracy.

Another antialiasing approach is disclosed in U.S. Pat. Nos. 6,072,500 & 5,684,939. In this prior approach, a method for generating antialiased display data comprises storing a pixel memory that indicates a current state of a pixel that comprises a plurality of supersamples, wherein said pixel memory comprises a region mask having a plurality of fields, each field being associated with a unique one of said supersamples; receiving a pixel packet, wherein said pixel packet indicates polygon coverage within said pixel, and a first color value; storing a second color value in an image memory, wherein said second color value is a function of said first color value; determining a new pixel state based on said current pixel state and said pixel packet; updating said pixel memory based on said new pixel state, wherein if said new pixel state is a state in which the color value of each supersample is either said second color value or a third color value, each of the fields associated with a supersample having said second color value stores an identifier that identifies said image memory; and generating antialiased display data based on said pixel memory. One drawback with this technique is that it requires region masks to be stored in pixel memory—with a corresponding increase in the size and cost of the pixel memory.

In summary, although various full-scene anti-aliasing (FSAA) techniques have been developed to mitigate the aliasing problem with varying degrees of success, some of the more effective approaches (for example, those involving conventional super-sampling and per-pixel object-precision area sampling), are often too computationally intensive and expensive to implement within a low cost graphics system such as a home video game platform. Other techniques developed for lower cost systems have been partially effective, but suffer from accuracy problems. Therefore, while significant work has been done in the past, further improvements in anti-aliasing are desirable.

The present invention solves this problem by providing improved techniques and arrangements for anti-aliasing in a graphics system.

In accordance with one aspect of our invention, we have developed particular techniques for anti-aliasing using an embedded frame buffer. For example, we have discovered particularly advantageous ways to perform anti-aliasing on the fly during a "copy out" process wherein an image data representation is being transferred from an embedded frame buffer to another destination. Such techniques provide a highly efficient and cost-effective antialiasing approach that can be practically implemented in a low cost system.

We have also discovered ways to achieve higher antialiasing quality using a smaller number of multisamples than were formerly required. Typical existing multisample methods use "n" samples and a 1×1 box filter for reconstruction. We have discovered that by using a combination of particular sample patterns (i.e., multisample spatial distribution) and particular filter configurations that "share" some multisamples among several pixels, we can achieve better anti-aliasing than an "n" sample pattern and a reconstruction/antialiasing filter that extends across only single pixel area.

For example, using three multisamples per pixel and a 1×2 reconstruction filter (i.e., a vertical filter that extends into one-half of the neighboring pixel areas immediately above and below the current pixel), and by using a specific sample pattern, we are able to achieve the equivalent of 6-sample antialiasing on vertical edges. Similarly, using a 1.33×2 reconstruction filter and a different sampling pattern, we achieve the equivalent of 6-sample antialiasing on vertical edges and 4-sample antialiasing on horizontal edges. On a more intuitive level, we are intentionally varying (jittering) the sample pattern between pixels so as to achieve better antialiasing at the expense of noise along the edges; and then increasing the extent of the reconstruction filter to greater than 1×1 to reduce or eliminate the additional noise while sharing some multisamples between pixels for anti-aliasing purposes—thus achieving the effect of more multisamples than we are actually storing on a per-pixel basis in the frame buffer. This dramatic increase in antialiasing quality without requiring a corresponding increase in the number of multisamples stored in the frame buffer has particular advantages for low-cost graphics systems such as home video game platforms and personal computer graphics cards.

Thus, in accordance with one aspect of the invention, a graphics system including graphics circuits coupled to an embedded frame buffer renders a multisampled data representation of an image and stores the rendered multisampled data representation in the embedded frame buffer. We then resample said embedded frame buffer contents to provide an anti-aliased image. We can perform such antialiasing filtering on the image in the process of transferring the image from the embedded frame buffer to another location.

In accordance with yet another aspect of the invention, an anti-aliasing method implemented within a graphics system of the type that generates an image comprising plural pixels involves generating a multisampled data representation of an image having plural samples associated with each of the plural pixels. We resample the multisampled data representation to create an antialiased image for display. The resampling includes blending at least one of the plural samples into plural image pixels (i.e., sharing some of the multisamples between plural reconstructed screen pixels).

In accordance with yet another aspect provided by the invention, an anti-aliasing method comprises providing plural supersamples within each pixel of a pixel array. We vary the spatial distribution of the supersamples within neighboring pixels of the pixel array, and apply, to the array, an anti-aliasing filter having a pixel aperture including super-samples of at least two neighboring pixels.

In accordance with a more detailed aspect provided by the invention, an anti-aliasing method comprises:
  defining, within an embedded frame buffer, plural (e.g., three) super-sampled locations within each pixel of a pixel array, each said super-sampled location having a corresponding color value; and
  applying a vertical color data blending filter that blends a set of the pixel super-sampled color values during an operation that copies the embedded frame buffer out to an external destination.

By way of further non-limiting example, the following are some of the additional features provided by aspects of the invention:
  coverage masking of programmable super-sample locations efficiently generate a super-sampled image;
  a one-dimensional (e.g., vertical) filter applied during a copy-out operation from an embedded frame buffer to an external frame buffer can be used to blend the super-sampled image;
  super-samples from neighboring pixels can be included in the anti-aliased blend; and
  programmable locations and filtering weight(s) of the supersamples in the blend.

Another aspect of the invention provides, in a graphics system, a pixel data processing arrangement for providing full-scene anti-aliasing and/or de-flickering interlaced displays, comprising:
  a frame buffer containing super-sampled pixel data for a plurality of pixels;
  a plurality of scan-line buffers connected to receive super-sampled pixel color data from the frame buffer; and
  a multi-tap selectable-weight blending filter coupled to the scan-line buffers, the blending filter characterized by a vertically-arranged multiple-pixel filter support region wherein one or more color data samples from a plurality of vertically disposed pixels are blended to form a pixel color.

A further example anti-aliasing arrangement provided in accordance with an aspect of the invention includes:
  at least one storage location that defines plural super-sample locations within at least one pixel of a pixel array, each super-sample location having a corresponding color value;
  a coverage mask that specifies, for each of the plural super-sample locations within the at least one pixel, whether the plural super-sample locations are covered by rendered primitive fragments; and a one-dimensional color data blending filter that blends a resulting set of super-sample color values based on a programmable weighting function.

In one particular, non-limiting arrangement, the storage location may define three super-sample locations within the pixel. The filter may blend super-sample color values corresponding to the pixel with super-sample color values corresponding to at least one further pixel neighboring the pixel. The filter may blend super-sample color values corresponding to three vertically aligned pixels to produce a screen pixel output.

A further particular anti-aliasing technique provided in accordance with an aspect of the invention operates by:

defining three sample locations for obtaining super-sampled color data associated with a pixel for each of a plurality of neighboring pixels;

using a coverage mask to enable/disable samples corresponding to such locations, the coverage mask being based at least in part on corresponding portions of each pixel that are occupied by rendered primitive fragments; and blending resulting color data obtained from the locations to provide a pixel final color value.

A further aspect of the invention provides, for a pixel quad having first, second, third and fourth pixels and a quad center, a method of defining an optimal set of three super-sampling locations for anti-aliasing comprising:

defining a first set of super-sample locations for a first pixel in the pixel quad at the following coordinates (range 1–12) relative to the quad center: (12,11) (4,7) (8,3);

defining a second set of super-sample locations for a second pixel in the pixel quad at the following coordinates (range 1–12) relative to the quad center: (3,11) (11,7) (7,3);

defining a third set of super-sample locations for a third pixel in the pixel quad at the following coordinates (range 1–12) relative to the quad center: (2,2) (10,6) (6,10); and defining a fourth set of super-sample locations for a fourth pixel in the pixel quad at the following coordinates (range 1–12) relative to the quad center: (9,2) (1,6) (5,6).

In still more detail, a preferred embodiment of the present invention provides efficient full-scene anti-aliasing by, inter alia, implementing a programmable-location super-sampling arrangement and using a selectable-weight vertical-pixel support area blending filter. For a 2×2 pixel group (quad), the locations of three samples within each super-sampled pixel are individually selectable. Preferably, a twelve-bit multi-sample coverage mask is used to determine which of twelve samples within a pixel quad are enabled based on the portions of each pixel occupied by a primitive fragment and any pre-computed z-buffering. Each super-sampled pixel is filtered during a copy-out operation from a local memory to an external frame buffer using a pixel blending filter arrangement that combines seven samples from three vertically arranged pixels. Three samples are taken from the current pixel, two samples are taken from a pixel immediately above the current pixel and two samples are taken from a pixel immediately below the current pixel. A weighted average is then computed based on the enabled samples to determine the final color for the pixel. The weight coefficients used in the blending filter are also individually programmable. De-flickering of thin one-pixel tall horizontal lines for interlaced video displays can be accomplished by using the pixel blending filter to blend color samples from pixels in alternate scan lines.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 12 shows an exemplary super-sampling coverage mask for a pixel quad of the type shown in FIG. 7;

FIG. 13 shows an exemplary copy-out pipeline for the graphics processor of FIG. 3 between the embedded frame buffer and the external frame buffer;

FIG. 14 shows a vertical filter blending programmable 7-tap filter used for anti-aliasing in accordance with the instant invention;

FIGS. 21A and 21B show example alternative compatible implementations.

DETAILED DESCRIPTION OF EXAMPLE EMBODIMENTS OF THE INVENTION

Figure 1:
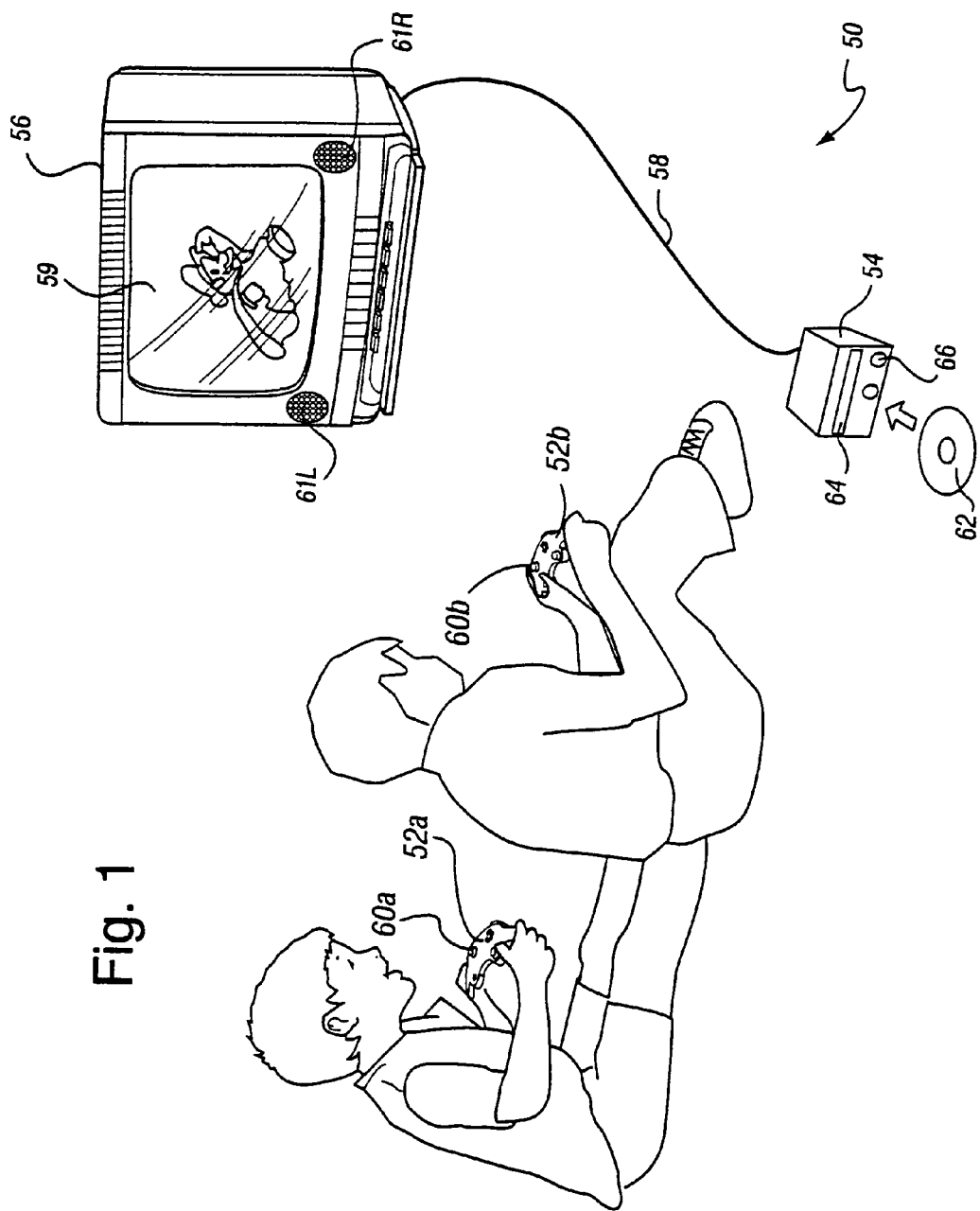
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
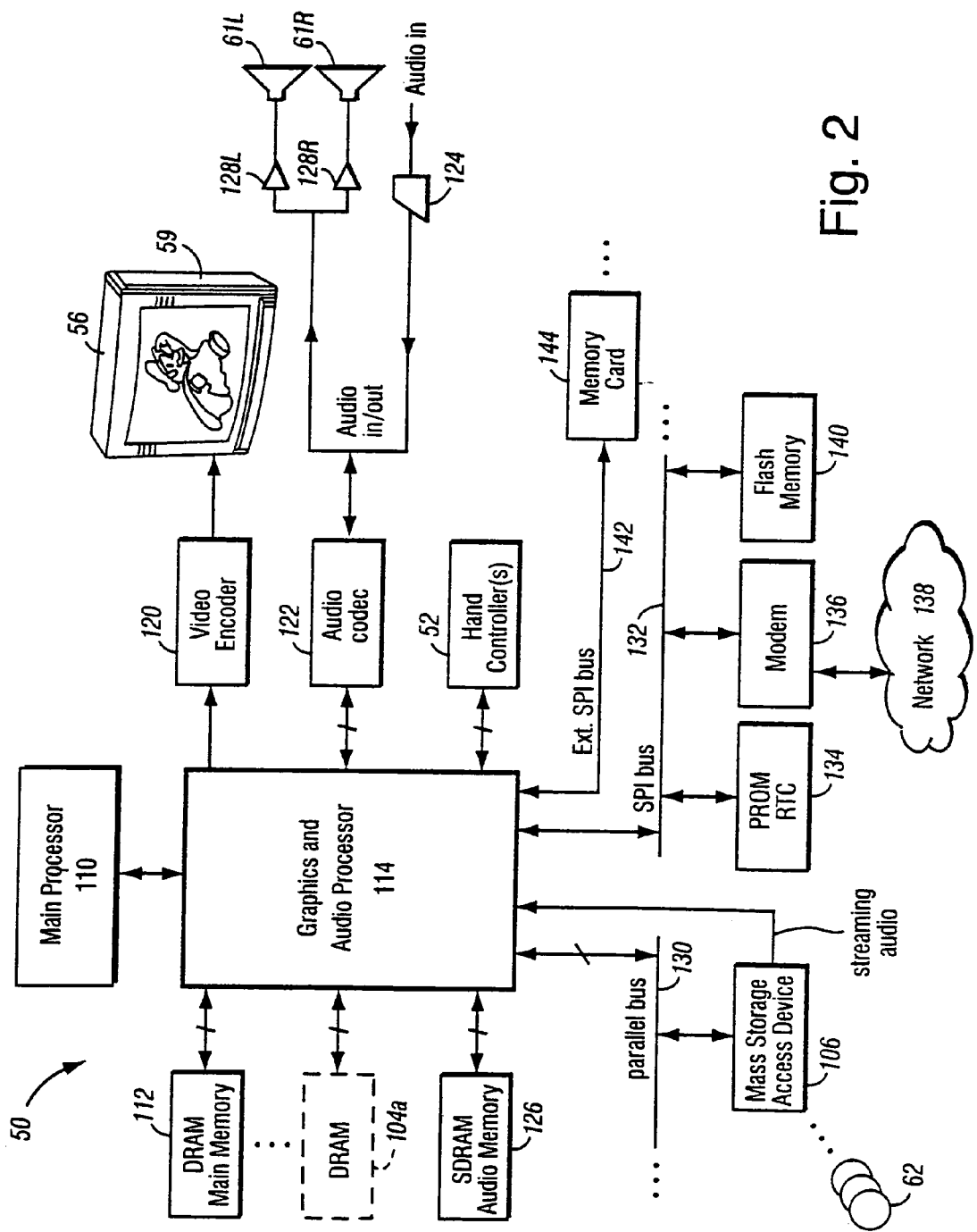
FIG. 2 is a block diagram of the FIG. 1 example computer graphics system.

FIG. 2 shows a block diagram of example components of system 50. The primary components include:
   a main processor (CPU) 110,
   a main memory 112, and
   a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
   a programmable read-only memory and/or real time clock 134,
   a modem 136 or other networking interface (which may in turn connect system 50 to a telecommunications network 138 such as the Internet or other digital network from/to which program instructions and/or data can be downloaded or uploaded), and
   flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
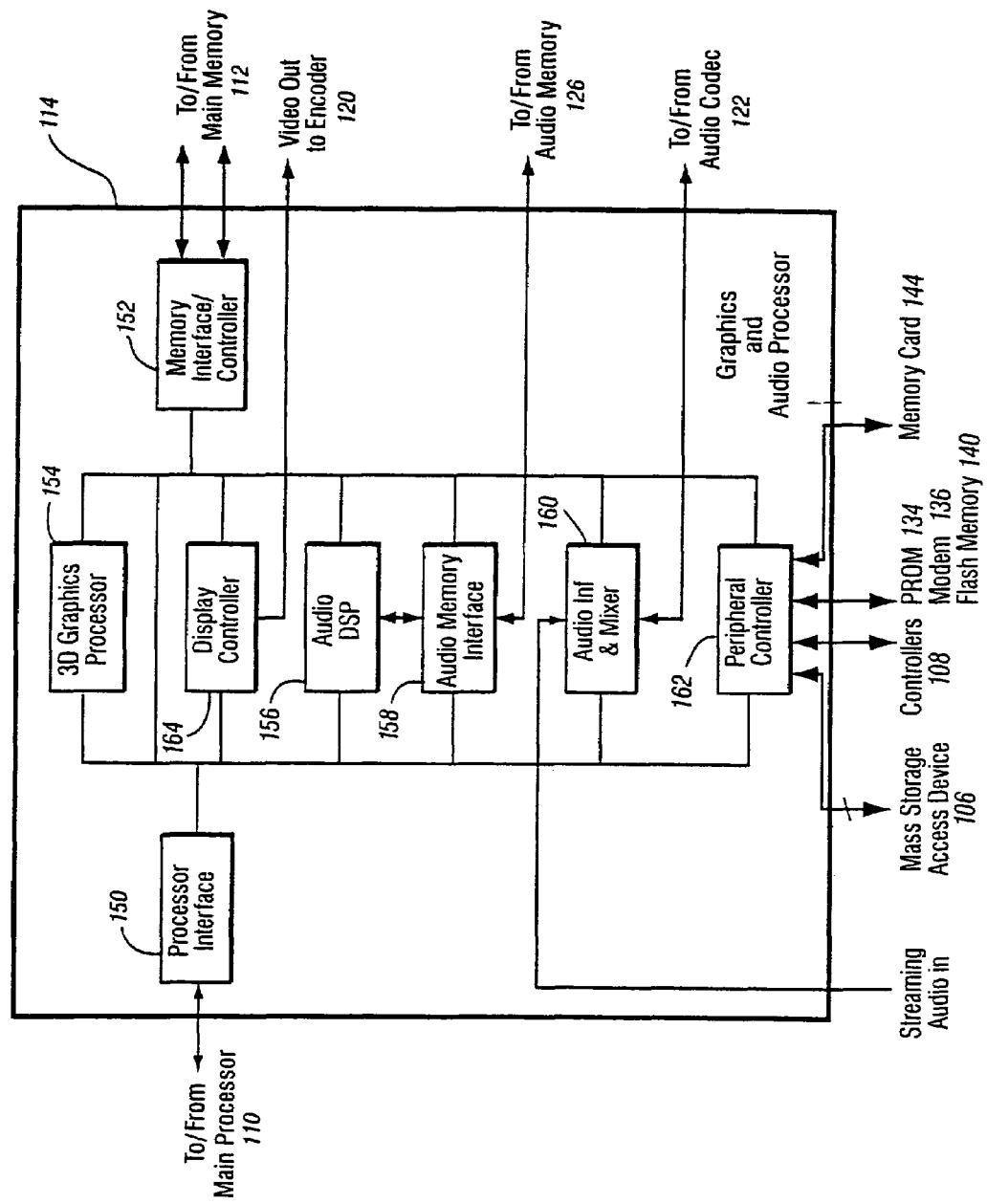
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
   a processor interface 150,
   a memory interface/controller 152,
   a 3D graphics processor 154,
   an audio digital signal processor (DSP) 156,
   an audio memory interface 158,
   an audio interface and mixer 160,
   a peripheral controller 162, and
   a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
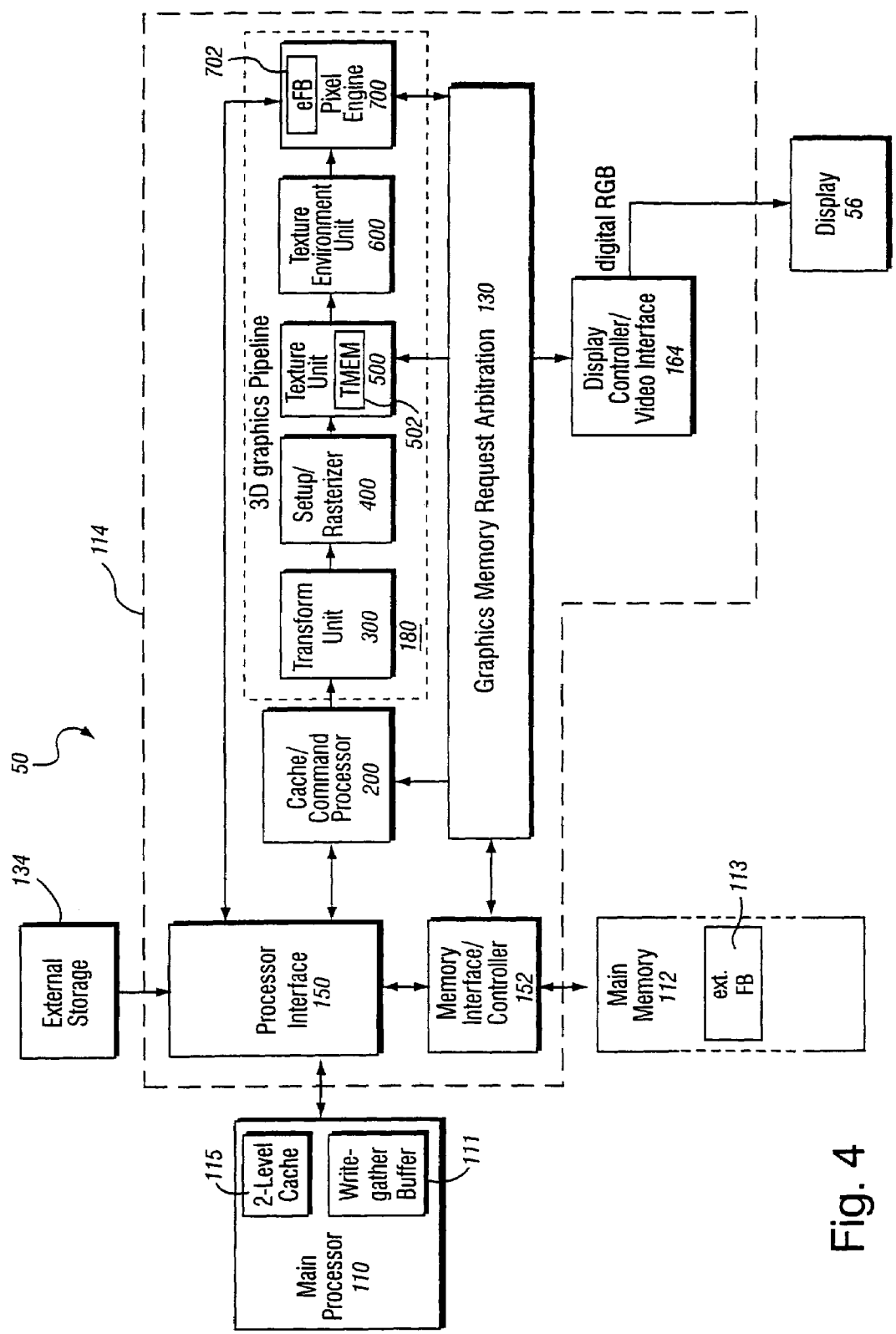
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
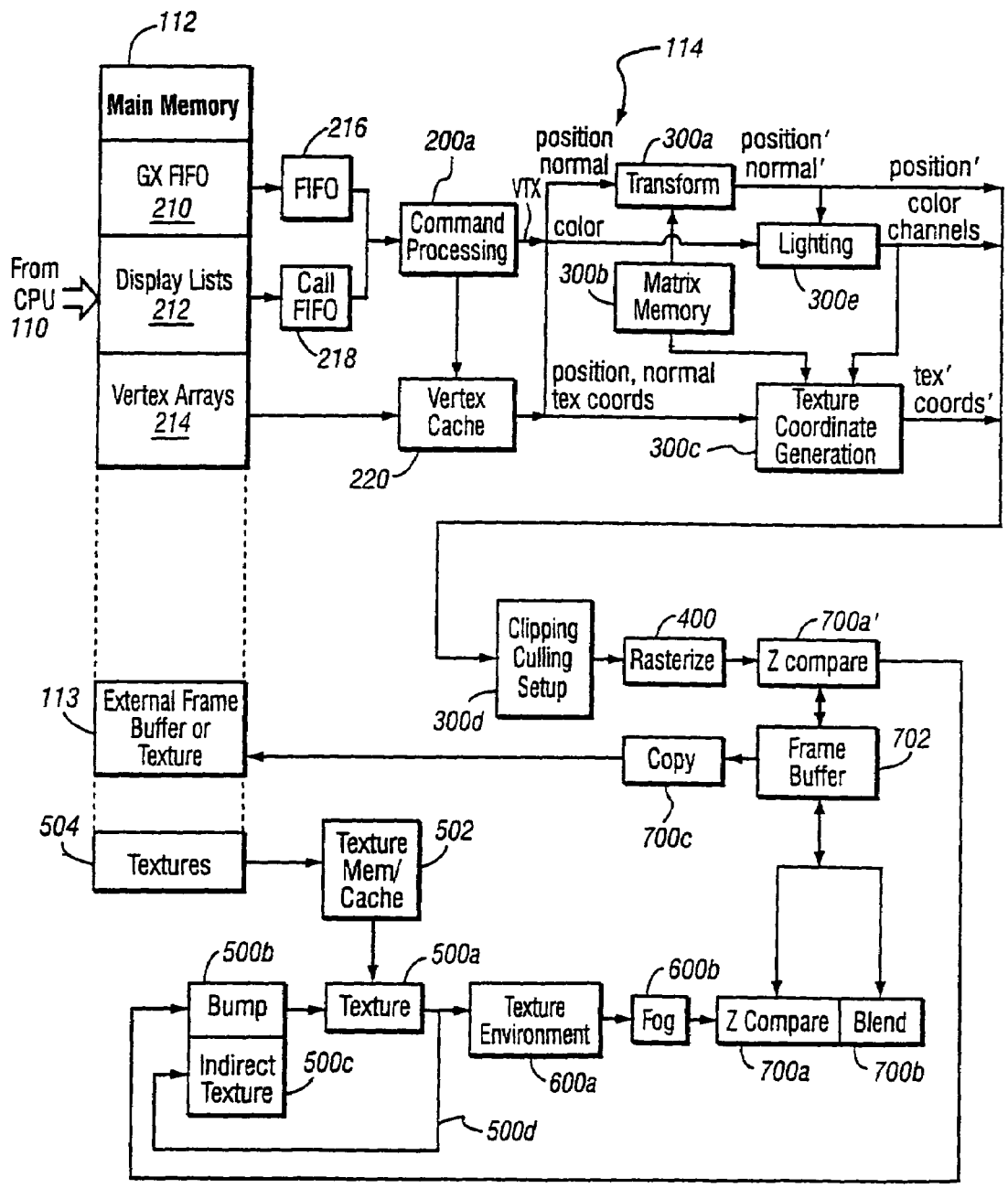
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300*a* (see FIG. 5). Transform unit 300 may include one or more matrix memories 300*b* for storing matrices used in transformation processing 300*a*. Transform unit 300 transforms incoming geometry per vertex from object space to screen space; and transforms incoming texture coordinates and computes projective texture coordinates (300*c*). Transform unit 300 may also perform polygon clipping/culling 300*d*. Lighting processing 300*e* also performed by transform unit 300*b* provides per vertex lighting computations for up to eight independent lights in one example embodiment. Transform unit 300 can also perform texture coordinate generation (300*c*) for embossed type bump mapping effects, as well as polygon clipping/culling operations (300*d*).

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500*a*) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500*b*), and indirect texture processing (500*c*).

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a*' can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to main memory 112 for access by display/video interface unit 164. This copy operation 700*c* can also be used to copy embedded frame buffer 702 contents to textures in the main memory 112 for dynamic texture synthesis effects. Antialiasing and other filtering can be performed during the copy-out operation from the embedded frame buffer (EFB) to the external frame buffer (XFB). The frame buffer output of graphics pipeline 180 (which is ultimately stored in main memory 112) is read each frame by display/video interface unit 164. Display controller/video interface 164 provides digital RGB pixel values for display on display 102.

Example Anti-Aliasing Techniques and Arrangements

Figure 6:
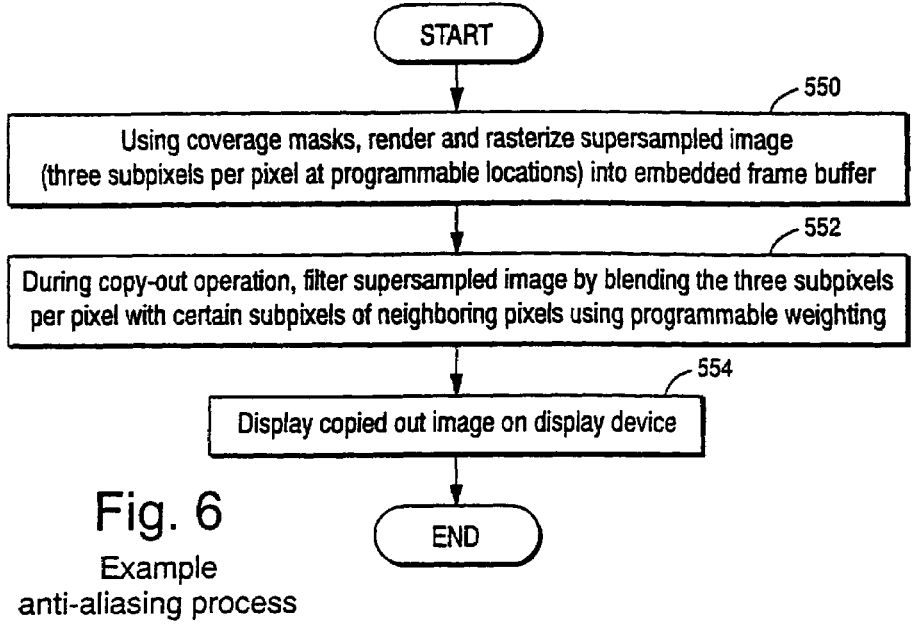
FIG. 6 shows an example anti-aliasing process.
Figure 6A:
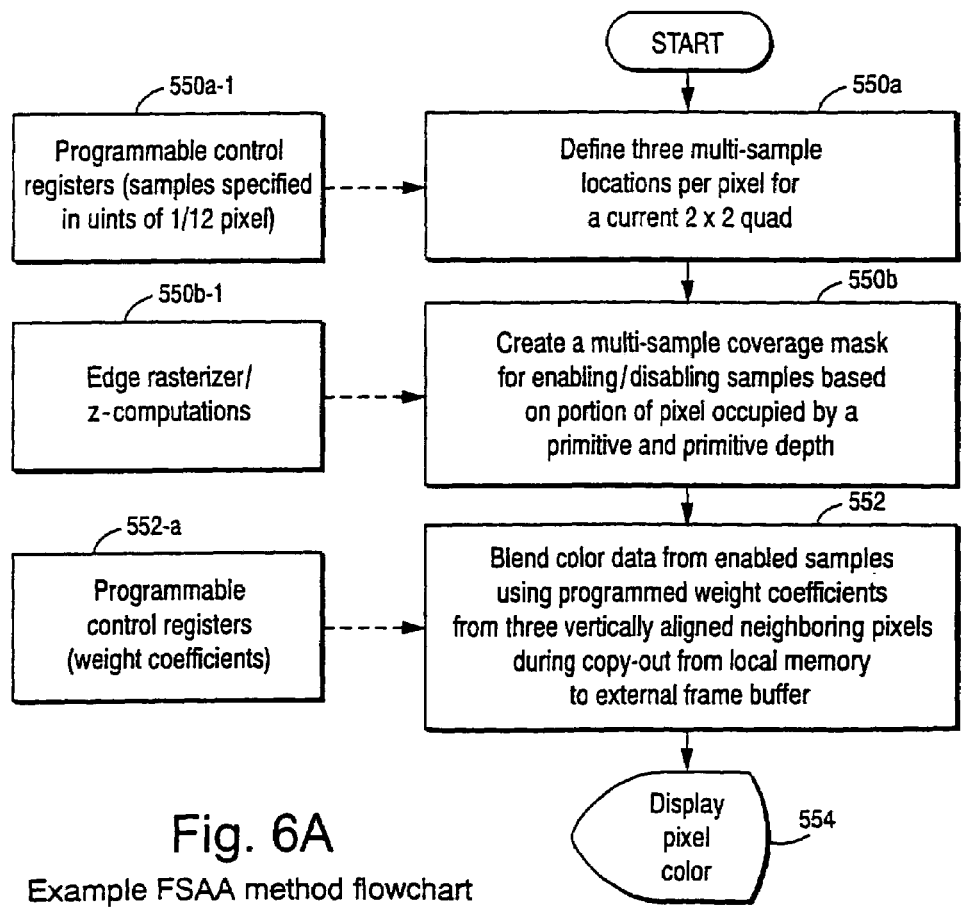
FIG. 6A shows an exemplary flowchart of the anti-aliasing method of the instant invention.

As shown in FIG. 6, anti-aliasing is performed in two main phases in the example embodiment. The first phase occurs during rendering and involves rasterizing the image into a super-sampled embedded frame buffer (EFB) (block 550). The second phase performed during a copy-out operation involves filtering/blending the super-samples to create screen pixel output colors (block 552). The copied-out image is then displayed on display 56 (block 554). FIG. 6A provides a more detailed summary block diagram of the anti-aliasing in accordance with an aspect of this instant invention. The anti-aliasing starts by defining three multi-sample locations per pixel for a current 2×2 pixel quad (block 552). Programmable control registers are used to determine the location of the samples in units of $1/12$ pixel (block 550$a$-1). A multisample coverage mask is then created for enabling/disabling samples based on the portion of the pixel occupied by a primitive (block 550$b$). If early z-compare is enabled, the coverage mask can also be affected by the primitive depth (block 550$b$). Once a frame is completed and all primitives have been rendered into the embedded frame buffer, the color data from enabled samples is blended, using programmable weighting coefficients (block 552$a$), from three vertically aligned neighboring pixels during copy-out from the local memory (EFB) to main memory (XFB) (block 552). The anti-aliased pixel color is then displayed from the XFB by the video interface unit (block 554).

Each of the two basic phases of anti-aliasing (rasterizing and filtering) will be described in detail below.

Rasterizing/Rendering Phase

The first anti-aliasing phase (FIG. 6, block 550) occurs when the rasterizer (400$b$) is performing edge rasterization into the embedded frame buffer (EFB) 702. Preferably, this rasterizer is an edge and z rasterizer which generates x, y, z and coverage mask values for programmable super-sample locations within every visible pixel quad contained by the current triangle or other primitive. The primitive information is preferably received from the setup unit 400 in a form suitable for easy rasterization. The process is repeated for each primitive in the image.

Pixel Quads Have Programmable Subpixel Locations

Figure 7:
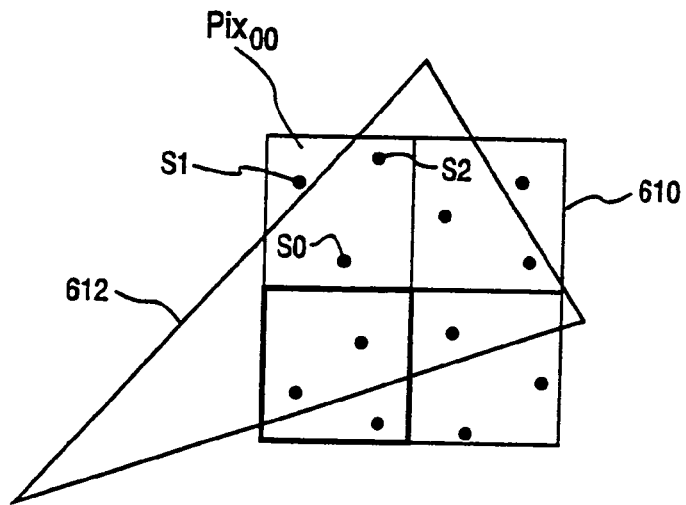
FIG. 7 shows an exemplary primitive and super-sampled pixel quad.

FIG. 7 shows an exemplary pixel quad 610 with an example primitive (e.g., triangle) 612 overlaid thereon. The pixel quad includes 4 pixels (Pix00, Pix01, Pix10 and Pix11) in a 2×2 configuration. Within each pixel (e.g. Pix00) in the quad 610, three super-sample locations (e.g. S0, S1 and S2) are programmably selected and specified. This results in twelve super-sample locations per pixel quad 610. While the graphics pipeline described above processes pixels in quads, other arrangements are also possible.

Figure 8:
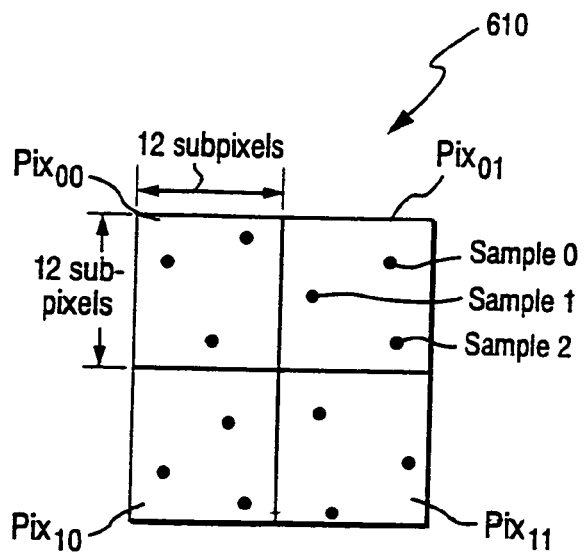
FIG. 8 shows an exemplary sampling pattern for a quad.

Irrespective of how many pixels are generated in parallel, each pixel Pix in the example embodiment includes plural (e.g., three in one particular implementation) sub-pixels (see FIG. 8). In the example arrangement, the location of each of these sub-pixels within the pixel quad is programmable.

Furthermore, in the example embodiment, each pixel quad within a pixel array comprising thousands of pixels includes twelve such sub-pixels at corresponding programmable locations. As can be seen most clearly in FIG. 8, the three sample locations S within each pixel of the quad 610 can be different for each neighboring pixel. FIG. 8 shows one example of three sample locations within each pixel. In accordance with an aspect of the invention, we can vary ("jitter") the sample pattern between pixels (e.g., the spatial distribution of the multi-sample locations within the neighboring pixels) so as to achieve better antialiasing at the expense of noise along the edges. We can then increase the extent of the reconstruction filter to greater than 1×1 to reduce the noise. Increasing the reconstruction filter to greater than 1×1 means that some multisamples are shared between different pixels, i.e., they contribute to the anti-aliased screen pixel output color of more than one screen pixel for display. Thus, we get the effect of more multi-samples per pixel than we are actually storing in the frame buffer. In certain cases, with a carefully constructed super-sample pattern, the additional filter is able to cancel out the noise entirely.

The programmer can set the subsample locations by writing global registers. In this particular embodiment, super-sample locations may be specified as x and y distance (e.g., in units related to pixel size, e.g., $1/12$ pixel), from the pixel quad center. In other arrangements (e.g., those not based on pixel quads), different approaches to specifying the multisample locations within the various pixels can be used. Since the location of each of the super-samples in each pixel is programmable in the example embodiment in the example embodiment, the particular sampling locations (S0–S1) for each quad can be changed as desired for the particular application. On the other hand, in alternative embodiments, a particularly optimal multisample location values could be fixed (e.g., set in hardware) so the application programmer does not need to worry about it. Thus, while the locations are programmable in the example embodiment, a hardwired optional pattern could be used in lieu of programmability. Whatever pattern is selected, it can be repeated across a certain number of neighboring pixels in a frame.

Figure 9:
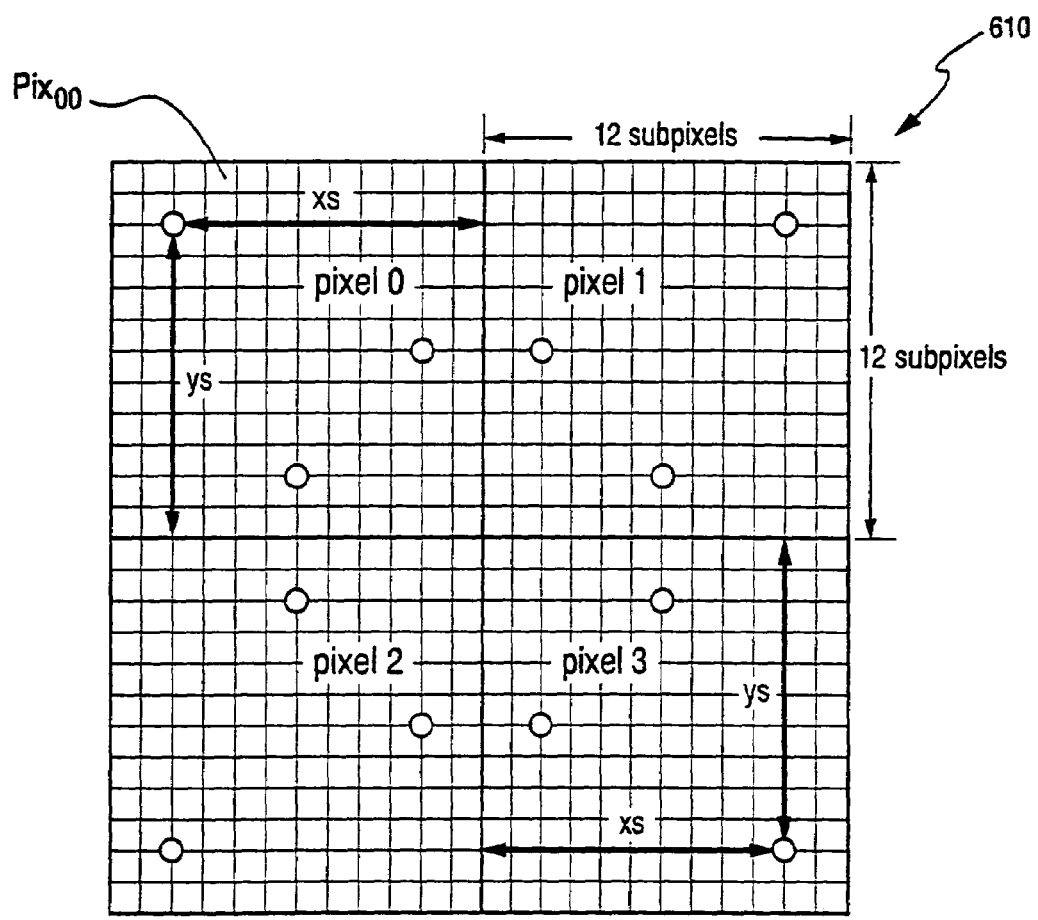
FIG. 9 shows how each pixel is divided into a 12×12 subpixel grid where super-sample locations can be defined.

One convenient way to specify the particular spatial distribution of multisamples within the pixel array in the example embodiment is to specify multisample locations within a pixel quad relative to the center of the pixel quad. FIG. 9 shows that in the example embodiment, each pixel in the quad is broken down into a 12×12 grid. Each sample has a specified x and y distance (in units of $1/12$ pixel) from the center of the quad. Thus, xsij,ysij, where j=(0–2) and i=(0–3), specifies the location (x and y coordinate) of multisample location j in pixel i for the quad.

Figure 10:
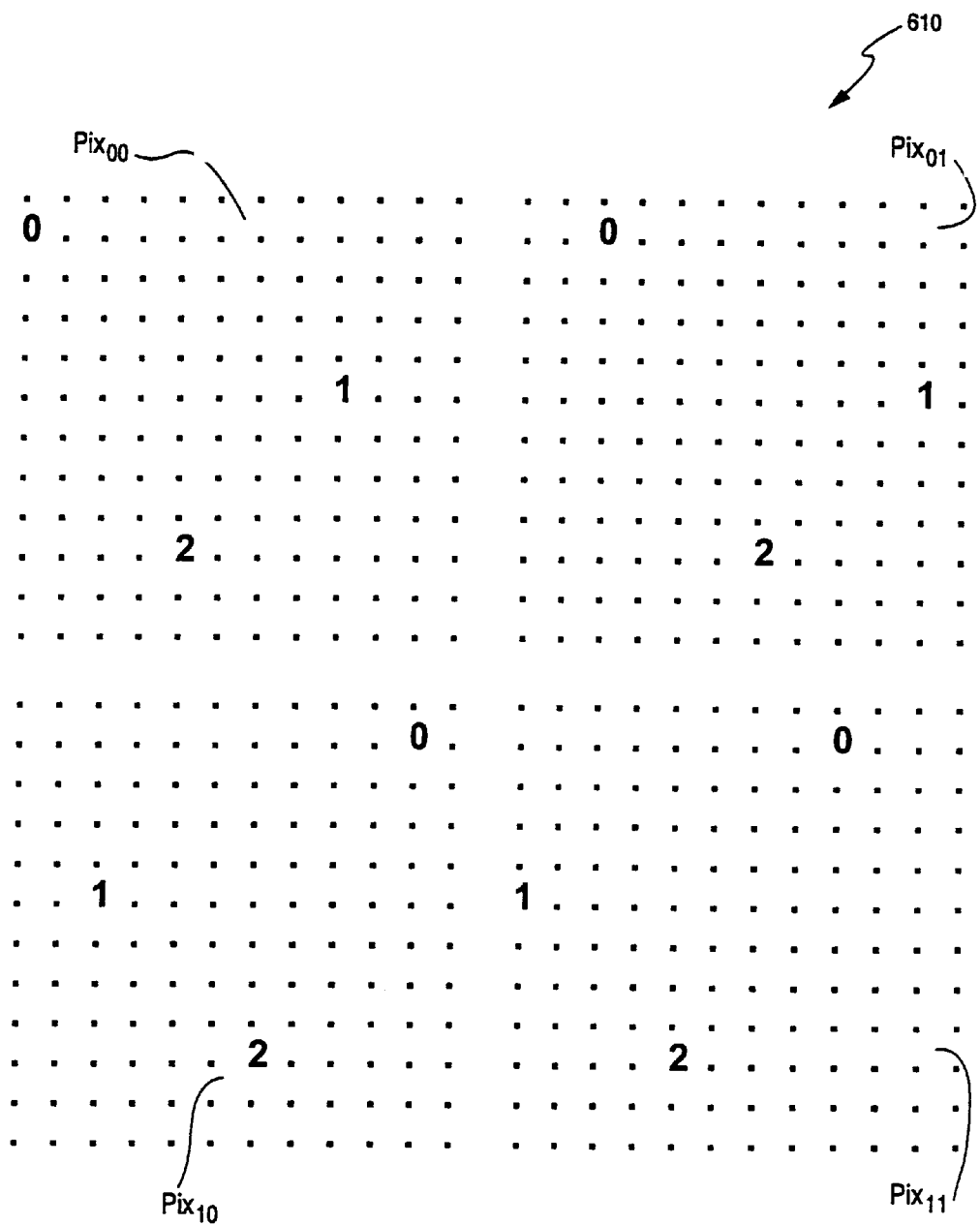
FIG. 10 shows a preferred super sample patterns for particular corresponding reconstruction filter configuration.

FIG. 10 shows an enlarged view of a quad wherein preferred example sample locations are shown for each pixel in the quad. This preferred pattern has been determined to provide good results for certain applications. In particular, this preferred sampling pattern works well for a system that provides three multisamples within each pixel and a 1×2 reconstruction filter vertical filter coefficients ($1/12$, $1/6$, $1/6$, $1/6$, $1/6$, $1/6$, $1/12$) (see FIGS. 14 & 16)—which filter will cancel out the noise intentionally introduced into the FIG. 10 multi-sample distribution pattern through jittering of multisample locations within neighboring pixels. By "1×2" reconstruction filter, we mean that the filter aperture extends across a single pixel in the horizontal (x) dimension and extends across two pixels in the vertical (y) dimension (i.e., the filter "aperture" covers the entire area of the current pixel whose output is being generated along with half of area of the pixel just above the current pixel and half of the area of the pixel just below the current pixel). Note that the FIG. 10 pattern should be used with the appropriately configured reconstruction filter described above; if the FIG. 10 pattern is used without the corresponding filter, images will look worse than they would without any antialiasing.

Thus, in accordance with this aspect of the invention, there is a relationship between (a) the number and locations of multisamples, and (b) the aperture and weighting coefficients of the anti-aliasing (reconstruction) filter. The combination of a specific sample pattern and a specific filter can give substantially better antialiasing than a "n" sample pattern and 1×1 filter alone for a given number of multisamples per pixel.

In FIG. 10, and assuming that numbers 1–12 are used for the x and y (distances) scale from the center of the quad, the preferred locations are as follows:

| for PixelId 0: | xs00 = 12, | ys00 = 11 |
|---|---|---|
| | xs01 = 4, | ys01 = 7 |
| | xs02 = 8, | ys02 = 3 |
| for PixelId 1: | xs10 = 3, | ys10 = 11 |
| | xs11 = 11, | ys11 = 7 |
| | xs12 = 7, | ys12 = 3 |
| for PixelId 2: | xs20 = 2, | ys20 = 2 |
| | xs21 = 10, | ys21 = 6 |
| | xs22 = 6, | ys22 = 10 |
| for PixelId 3: | xs30 = 9, | ys30 = 2 |
| | xs31 = 1, | ys31 = 6 |
| | xs32 = 5, | ys32 = 10 |

While the three sample points are numbered (0–2) in FIG. 10 based on their relative position from the top of each pixel, the samples may be numbered based on their y distance from the center of the quad. The numbering is taken into account during the filtering operations described below, wherein the pixel having the greatest y value in each quad may not be used by the filter.

Other sample patterns may be used to allow us to use a different number of multisamples per pixel and/or a different filter aperture. In this particular implementation of our invention, we have chosen to use 3 samples per pixel and a 1×2 reconstruction filter. By using a specific sample pattern, we are able to achieve the equivalent of 6-sample antialiasing on vertical edges. However, in another example implementation, we can use a 1.33×2 reconstruction filter (i.e., a horizontal and vertical reconstruction filter with an aperture in the horizontal or x dimension that extends across the current pixel being generated and also covers ⅙ of the neighboring pixel immediately to the left of the current pixel and ⅙ of the area of the neighboring pixel immediately to the right of the neighboring pixel) with a different sampling pattern, and achieve the equivalent of 6-sample antialiasing on vertical edges, and 4-sample antialiasing on horizontal edges.

In another embodiment, another sample pattern may be used in a configuration having 4 samples per pixel and a 1.5×1.5 reconstruction filter. The sample pattern may achieve the equivalent of 6 sample antialiasing on both horizontal and vertical edges with only 4 supersamples stored in the frame buffer for each pixel. The filtering would be barely noticeable, however the increase in anti-aliasing quality would be significant. Subjective tests show a very big jump in perceived quality between 4 and 6 samples, and the quality curve is then fairly flat after 6 samples (e.g. most users cannot tell the difference between 6 samples and 16). This technique thus allows good quality antialiasing using 4 samples (as opposed to today's existing lower quality anti-aliasing), and eliminates the need (and expense) of going to 8 multisamples per pixel to achieve good quality.

It is noted that the perceived visual quality of the anti-aliasing is generally subjective, in that it depends somewhat on the preferences of the particular individual viewing the resulting image. However, we have found that advantageous patterns and corresponding filter dimensions can be used which provide an increased perceived visual quality for many viewers. The selection of a particular pattern is generally done using a trial and error procedure. However, exemplary general criteria that may be used when selecting a pattern are as follows: 1) setting the pattern such that when moving a vertical edge horizontally one new sample is hit every, for example, $\frac{1}{6}^{th}$ of a pixel, thereby providing fairly even gray scale stepping; 2) setting the pattern such that when moving a horizontal edge vertically one new sample is hit every, for example, $\frac{1}{6}^{th}$ of a pixel, thereby also providing fairly even gray scale stepping; and 3) setting the pattern such that the samples are spread out as much as possible so that no clustering is visible when the pattern is viewed from a distance.

Figure 11:
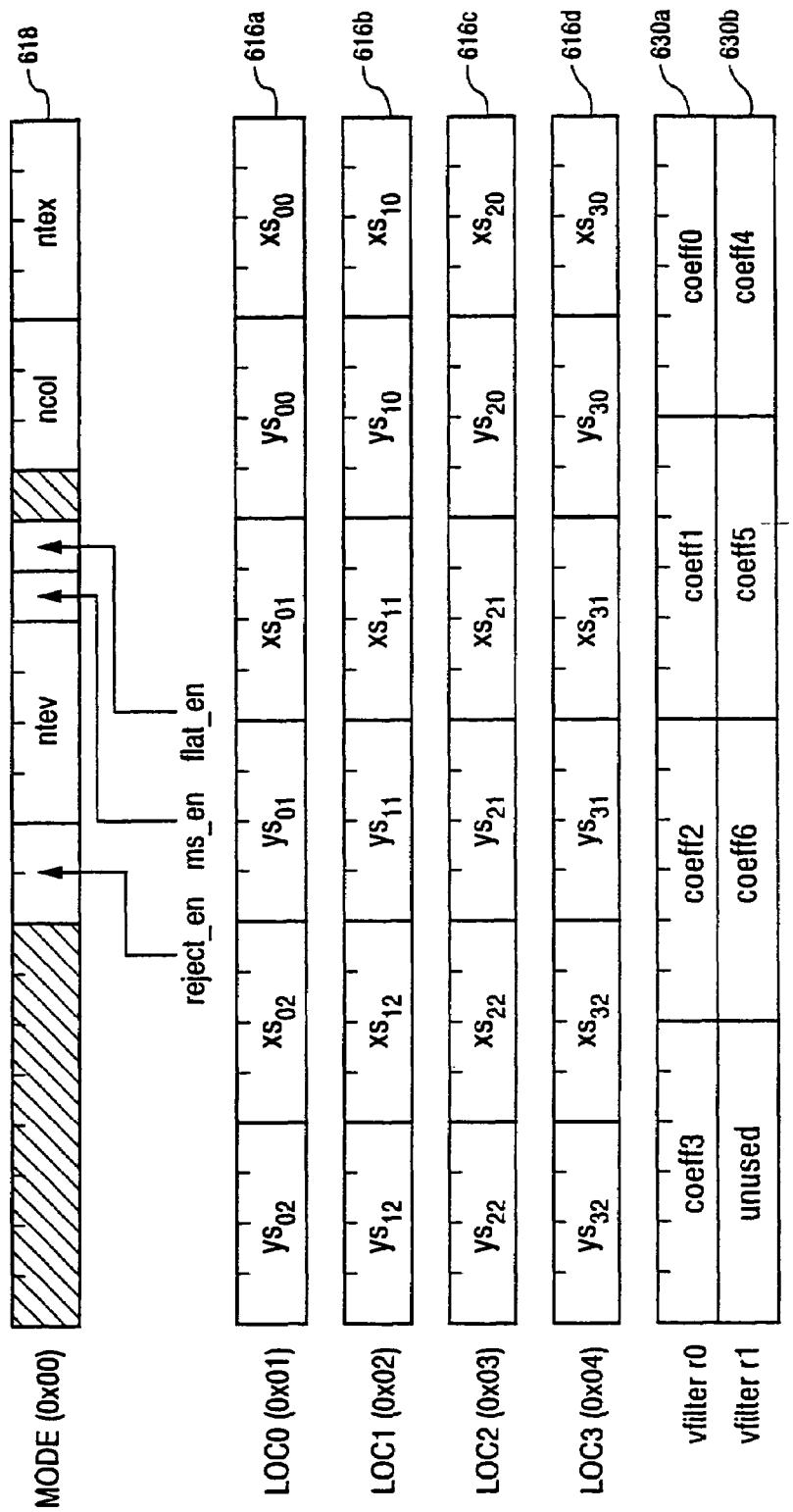
FIG. 11 shows exemplary control registers for setting sample location and filter coefficients.

Example Techniques for Programming Multisample Location/Spatial Distribution in Specific Disclosed Example Implementation FIG. 11 shows exemplary global registers (LOC0–LOC3) 616a, 616b, 616c and 616d for storing the x and y coordinate of each of the multisample locations within the quad 610 in the example detailed implementation. These locations can be programmed for each of the pixels in the quad using, for example, commands in the application program interface (API) for the graphics processor. These global registers 616a, 616b, 616c and 616d are used by the pixel engine to specify the sample locations. The following is an example API command or function which sets up these exemplary registers for this purpose:

GXSetAnti-Aliasing:
Argument:

| GXBool | Mode; | //Enable Anti-aliasing mode |
|---|---|---|
| u8 | SamplePts[4][3][2] | //Location of multisample points |

This function sets anti-aliasing mode. The application also sets the appropriate pixel format for anti-aliasing. It is noted that this mode is not per-primitive, but per-frame. The SamplePts array specifies the location of multisample points per pixel quad. The point offsets are given in $\frac{1}{12}$ pixel units. There are three points per pixel. The sample points may be specified as follows:

SamplePts [pixelId][pointId][x/y]

where,
PixelId 0=upper left pixel in a 2×2 block
PixelId 1=upper right pixel
PixelId 2=lower left pixel
PixelId 3=lower right pixel
PointId [0–2]=one of the three multisample points for the pixel.
x/y=x or y coordinate of the sample point.

FIG. 11 also shows an exemplary global register (Mode) 618 which includes a bit (ms_en) specifying whether or not multisampling is enabled. The ms_en bit is enabled for anti-aliasing. Thus, the system preferably enables selective operation of the anti-aliasing mode. This register 618 may also be used to specify other parameters for the system. For example, the ntex bits can be used to specify the number of sets of texture coordinates passed from the transform unit to the setup unit, and the number of sets of texture coordinates passed from the setup unit to the rasterization unit for texture coordinate rasterization. The ncol bits can be used to specify the number of sets of color values passed from the transform unit to the setup unit, and the number of sets of color values passed from the setup unit to the rasterizer unit for color rasterization. The reject_en bits can be used to specify how to reject triangles based on whether they are front or back facing (i.e. reject none, front, back or all). The flat_en bit can be used to specify that triangles are flat shaded. The n_tev bits can be used to specify the number of texture environment (TEV) operations currently defined.

Coverage Masks

As shown in FIG. 12, coverage masks 614 are generated for the pixel quads 610. The coverage mask 614 specifies which of the super-sample locations (S0–S2) are covered by each of the primitive fragments 612 being rasterized. In this context, the term "primitive fragment" refers to the portion of the current primitive being rendered that intersects with the pixel(s) currently being evaluated by the edge rasterizer 400b. The edge rasterizer 400b determines coverage in the process of rasterizing the various edges of primitive fragments 612. The coverage mask 614 is set according to the edge equation data for the current primitive developed by the rasterizer 400b.

In the example embodiment, the coverage mask 614 includes 12 bits, i.e. three bits for each pixel in the quad—each of the three bits corresponding to a different subpixel in the pixel. The coverage mask bits are set based on whether or not a primitive fragment is covering each of the respective super-sample locations in the quad 610.

The coverage mask 614 is used to enable/disable super-samples corresponding to the programmed super-sample locations based on whether the super-sample is covered by the current primitive fragment. The coverage mask records which of the super-sample locations of each pixel are occupied (covered) by a primitive fragment, and which of the super-sample locations are not occupied (uncovered) by the primitive fragment. This information is used in the example embodiment to realize efficiency improvements in the Z buffering operations to follow. While coverage masks are helpful in generating the various multisamples in the embedded frame buffer 702, they are not essential; other techniques not relying on coverage masks could be used in other implementations.

Z Buffering

The disclosed embodiment embedded frame buffer 702 includes a z (depth) buffer as well as a color buffer. The example embodiment uses the coverage mask 614 to determine whether or not to perform z buffering for each sub-sample location S. If a subsample location S is not covered by a primitive fragment, there is no need to perform a z compare for that subsample since the corresponding z and color values within frame buffer 702 will not be updated in any event. If the subsample location S is covered by the primitive fragment, then the z compare operation 700a is performed for that subsample to determine whether the primitive fragment is hidden or visible at that subsample location—and blend operation 700b conditionally blends colors into the embedded color frame buffer if the z compare 700a indicates that pixel fragment is visible at that sub-sample location.

To reduce the number of wires in the example implementation, a single 28-bit quad Z value with the format of 26.1 and Zx and Zy with format s26.5 are sent to the z compare 700a. The quad Z value is the value of pixel Z at the center of the pixel quad. Two 32-bit adders and two 5×32 bit multipliers can solve the plane equation for each subsample location by performing the following equation to extrapolate for the twelve samples in a pixel quad using the quad Z value and slope information obtained from the rasterizer 400b:

$$Z(dx, dy)=Z+(Zx)(dx)+(Zy)(dy)$$

where dx and dy are based on the pixel number and super-sample location (clamping may be performed as well to prevent overflow.

As mentioned above, Z comparison 700a' (see FIG. 5) can be performed at an earlier stage in the graphics pipeline 180 depending on the rendering mode currently in effect (e.g., Z compares can be performed if alpha test is not required). In such case, Z compare 700a' may conditionally perform Z buffering (depth compare and write) and on the extrapolated Z values developed by the plane equation discussed above. As a result of this operation, a number of bits and the coverage mask 614 may be cleared due to the Z buffering operation—thus allowing the cover mask to carry the results of the z compare down to a later stage in the pipeline where updating of the color frame buffer occurs. The resulting coverage mask, along with the x,y location of the pixel quad, is passed to texture coordinate rasterization processes preliminary to further processing by texture block 500a. If the "Z before texture" function is not enable, then Z compare block 700a (see FIG. 5) performs the Z compare and write prior to writing color into frame buffer 702—and the coverage mask is not changed by the results of the Z compare (but may of course still be used to determine whether a Z compare is even necessary for a particular subsample location).

Example Copy Out and Vertical Filtering

Once all primitives of a scene have been processed and a super-sampled image has been rendered into the embedded frame buffer (EFB) in the manner described above, the second phase of anti-aliasing (see FIG. 6A, block 552) can be performed as described below. However, before moving to the second phase, a brief explanation of the exemplary embedded frame buffer (EFB) is provided in order to provide a better understanding of the exemplary embodiment.

Example Embedded Frame Buffer Configuration

In this example, the embedded frame buffer (EFB) has a memory capacity of approximately 2 MB. The maximum pixel width and height of the frame buffer is determined by the size of each pixel. In this example, there are several different pixel sizes including for example:

48-bit color and z; and 96-bit super-sampled color and Z

The formats can preferably be set using the API. An example API function for this purpose is as follows:

GXSetPixelFormat

Argument:

| GXPixelFormats | Format | //Sets pixel format for frame buffer |
| --- | --- | --- |
| GXZCmprFormats | ZCmpr | //Sets compression format for 16 bit z |
| GXBool | Ztop | //Z compare before texture |

This function sets the format of the frame buffer. The function is called before any drawing operations are performed. The pixel format cannot be changed in the middle of a frame in the example embodiment. The 16 bit Z values (in multisample anti-aliasing mode) can be uncompressed or compressed. The compressed values give a better precision and range. The Ztop flag can be used to perform depth comparisons before texture mapping (Z-before-texture). This improves the texture bandwidth because less texels need to be fetched and filtered.

The 48-bit format for the embedded frame buffer (EFB) is intended for non-anti-aliasing, and has the following features:

24-bit color (either 8/8/8 with no alpha, or 6/6/6/6 with 6 bits of alpha)

24-bit Z.

In this mode, the format can support a maximum resolution of 640×528. The width must be between 0–640 and the EFB stride is fixed at 640 pixels.

The 96-bit super-sampling format is used for anti-aliasing and has the following features:

3 samples of 16-bit color (5 bits of Red, 6 bits of Green, 5 bits of Blue, no alpha)

3 samples of 16-bit Z (depth).

This format can support a maximum resolution of 640×264. The width is preferably between 0–640 and the stride is fixed at 640.

As can be seen from the above, while anti-aliasing increases visual quality on the polygon edges and intersections, it does cost performance and Z quality. Anti-aliasing uses the 96 bit super-sampling EFB format that requires twice as much memory as 48-bit point sampled pixels. This mode also reduces Z buffering precision to 16 bits rather than 24 bits in other formats. Anti-aliasing also reduces peak fill rate from 800 Mpixels/s to 400 Mpixels/s. However, if more that one stage is employed in the texture environment unit (TEV), this reduction is hidden, in that, in this example, using two TEV stages also reduces the fill rate to 400 Mpixels/s.

In one embodiment, the rendering rate with anti-aliasing activated drops down to two pixels/clock due to the embedded frame buffer 702 bandwidth limitations. However, if two or more textures are turned on, the rate at which pixel quads are sent to the pixel engine 700 drops down to less than or equal to one pixel quad every two clocks in this particular embodiment. In this case, turning on anti-aliasing will not impact fill rate. Thus, if a particular scene is geometry-limited, then anti-aliasing will not adversely impact rendering performance. On the other hand, if a particular scene is fill-limited, rendering performance may be substantially adversely impacted by activating anti-aliasing as opposed to using the point sampled mode. The same application can activate and deactivate anti-aliasing for different scenes and different images depending on whether the scenes or images are geometry-limited or fill-limited—or depending upon the image quality required in a particular scene or image. The ability to dynamically activate and deactivate anti-aliasing on a frame-by-frame basis provides great flexibility in allowing an application programmer to make tradeoffs between image quality and speed performance.

Example Copy Out Operation

The second stage of anti-aliasing occurs during copy-out from the embedded frame buffer (EFB) 702 to the display buffer 113 (external frame buffer (XFB)) in main memory 112. An example copy-out pipeline 620 for this example is shown in FIG. 13.

As shown in FIG. 13, the copy-out pipeline 620 includes:
an anti-aliasing/deflicker section 622,
an RGB to YUV section, and
a Y scale section which can be used during the process of copying the data from the embedded frame buffer (EFB) 702 to the external frame buffer (XFB) 113.

While the invention is directed to anti-aliasing, the second phase of which is performed by the anti-aliasing/deflickering section 622, a brief explanation of the other two sections in the copy pipeline is provided below to give a more complete understanding of the exemplary embodiment.

A luma/chroma (YUV) format stores the same visual quality pixel as RGB, but requires only two-thirds of the memory. Therefore, during the copy operation, the RGB format in the EFB is converted to a YUV format in the XFB, in order to reduce the amount of main memory used for the external frame buffer (XFB). This conversion is done by the RGB to YUV section 624.

The Y scale section 626 in the copy pipeline 620 enables arbitrary scaling of a rendered image in the vertical direction. Horizontal scaling is done during video display. A Y scale factor is defined in the API and determines the number of lines that will be copied, and can be used to compute the proper XFB size.

While not shown in FIG. 13, a gamma correction section my also be provided in the copy pipeline 620 between, for example, the anti-aliasing/deflicker section and the RGB to YUV section. Gamma correction is used to correct for the non-linear response of the eye (and sometimes the monitor) to linear changes in color intensity values. Three choices of gamma may be provided (such as 1.0, 1.7 and 2.2). The default gamma is preferably 1.0 and is set in, for example, a GXInit command in the API.

The anti-aliasing/deflickering section 622 of the copy pipeline 620 applies a 7 tap vertical filter 628 having programmable weightings (W0–W6). A sub-pixel weighted area sampling is used for anti-aliasing. The support for the vertical filter is a three-vertical-pixel area. An exemplary support area for this filter is shown in FIG. 14. When determining color for a current pixel N in anti-aliasing mode, super-samples in the pixel immediately above the current pixel (N−1), and supersamples in the pixel immediately below the current pixel (N+1), as well as super-samples in the current pixel (N) are used. Thus, a fragment's influence is not restricted to a single pixel, but rather is applied to other pixels too using a weighted 3-pixel vertical filter.

Example Copy Out Command

The EFB source and destination of the copy operation is specified using an exemplary API function as follows:
GXCopyFBToDisplay
Argument

| u16 | SrcLeft | //Upper-Left coordinate of the source rectangle |
|---|---|---|
| u16 | SrcTop | |
| u16 | SrcWidth | //Width, in pixels, of the source rectangle |
| u16 | SrcHeight | //Height, in pixels, of the source rectangle |
| Void* | DstBase | //Address of destination buffer in memory |
| u16 | DstStride | //Stride, in multiple of 32B, of destination buffer |
| GXBool | Clear | //enable clearing color and Z frame buffers |

This function copies the contents of the embedded frame buffer (EFB) to the display buffer 113 in main memory. By the term "copy out" we don't mean simply a transfer of all the information; rather, we mean that the contents of the embedded frame buffer are read out, further processed (e.g., filtered, resampled, scaled, etc.) and that the resulting data is then sent elsewhere (e.g., to an external point sample type frame buffer). The origin of the rectangle is at X=SrcLeft and Y=SrcTop. The Clear flag enables clearing of the color and z buffer to the current clear color and z values. The clearing of the embedded frame buffer preferably occurs simultaneously with the copy operation.

As shown in FIG. 14, when in anti-aliasing mode in the example embodiment, the blending filter 628 uses all of the super-samples from the current pixel, some super-samples from the pixel immediately above the current pixel and some samples from the pixel immediately below the current pixel. Preferably, the farthest sample from the current pixel within each of the two surrounding pixels (i.e. N−1 and N+1) is not used in the filtering operation. While the three pixel support for the filter has nine samples, only seven of the nine samples are used in the blending operation in the example embodiment, as shown in FIG. 14.

Figure 15:
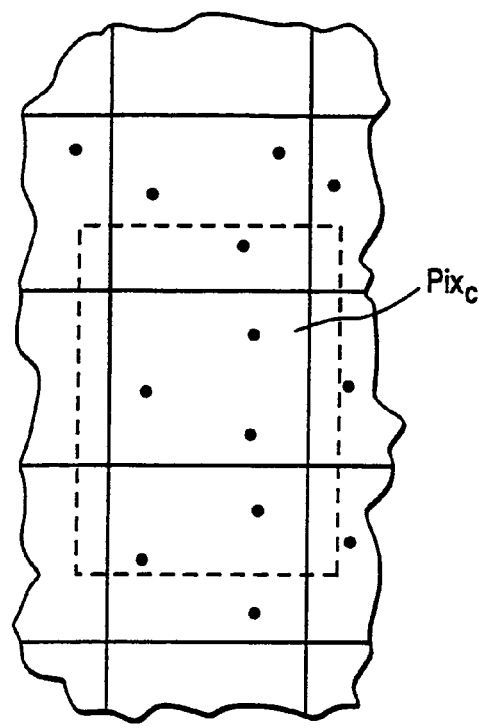
FIG. 15 shows an example vertical filter aperture.

The example anti-alias filter provides a one-dimensional (i.e., 1×2 or vertical) filtering "aperture" encompassing all of the subpixels in the pixel whose color is being developed plus some additional subpixels of the pixels immediately above and below the current pixel. See FIG. 15. Since the example implementation filters vertically anyway for flicker reduction, this is a very inexpensive way of doubling the antialiasing quality for vertical edges. Even for non-interlaced displays, most viewers are probably willing to sacrifice a certain amount of filtering of the image in exchange for better anti-aliasing.

The resulting vertical filter output provides a single screen pixel color value (RGB) for copying into the external frame buffer and display on display device 56. This vertical filtering operation thus acts as a low-pass filter stage as well as a resampler that resamples at the resolution of display 56. In this particular example, the neighboring pixels to the left and right of the current pixel Pixc do not contribute to the screen pixel output. In other implementations, however, a horizontal filter or a combination vertical and horizontal filter could be used. In the example embodiment, horizontal resampling may be activated for other purposes to provide resampling in both dimensions.

Figure 16:
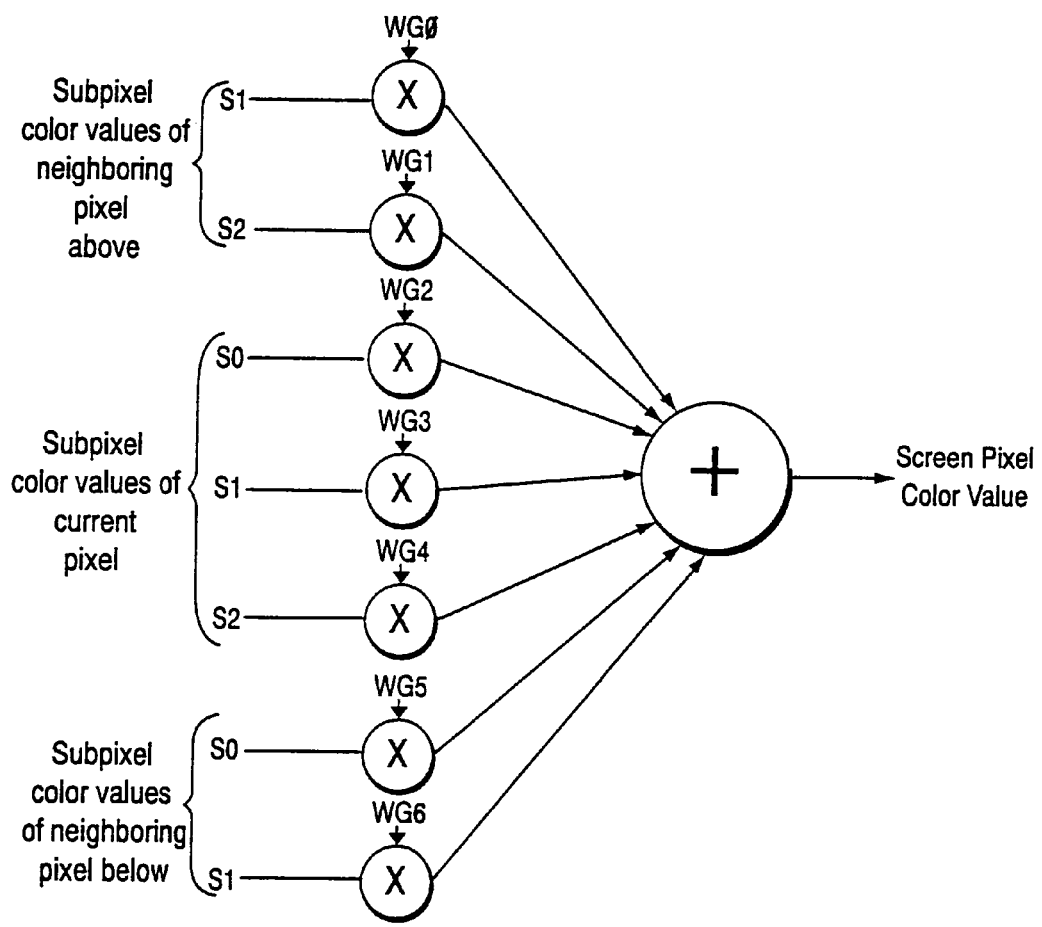
FIG. 16 shows an example vertical filter structure.

FIG. 16 shows an example vertical filter structure that implements the functions shown in FIG. 14.

In the example embodiment, a respective weighting coefficient (W0–W6) is applied to each of the seven samples being vertically filtered, and then the weighted samples are added (blended) together to obtain the final pixel color (N') for the current screen pixel. The respective weighting coefficients (W0–W6) are programmable in this example. The following is an example of an API function that can be used to set these programmable weighting coefficients.

GXSetAAFilter

Argument:

| u8 | Coefficients[7] | //filter coefficients in multiples of 1/64 |

This function sets the vertical filtering coefficients for anti-aliasing during copy-out from the embedded frame buffer. The filter coefficients are 6-bit numbers given in multiples of 1/64. The filter coefficients are applied to vertical lines as the image is copied out to the external frame buffer. The same coefficients can be used for de-flickering the image when it is copied out (i.e. when anti-aliasing is not enabled).

FIG. 11 shows exemplary registers 630a and 630b for storing the seven weighting coefficients for use in the filtering operation of FIG. 14. While the weighting coefficients are programmable, example weightings for anti-aliasing with this vertical filter useful with the multisample spatial distribution pattern shown in FIG. 10 are as follows:

W0=1/12, W1=1/6, W2=1/6, W3=1/6, W4=1/6, W5=1/6 and W6=1/12

As discussed above, different filter weights and/or configurations can be used with different numbers of multisamples per pixel, different multisample spatial distributions, and different reconstruction filter apertures.

Anti-Alias Buffering

Figure 17:
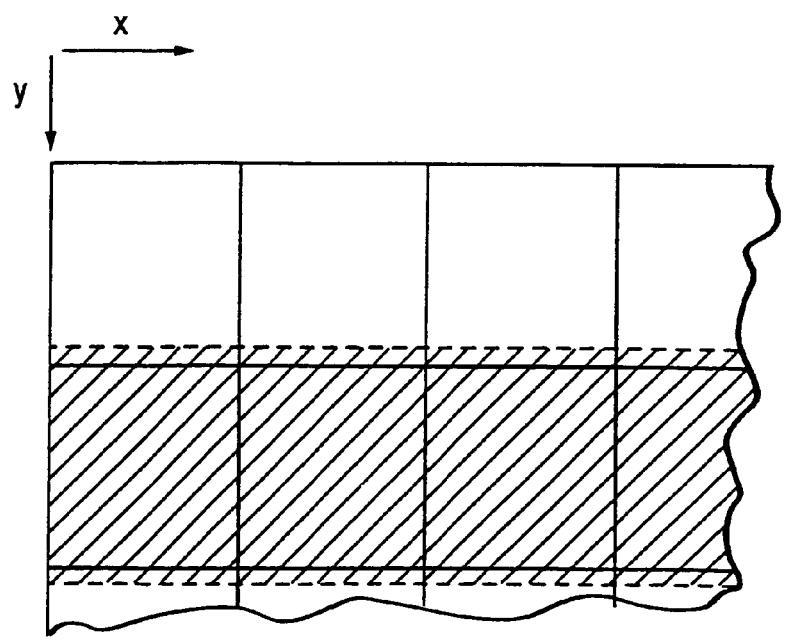
FIG. 17 shows an example anti-aliasing copy out buffering operation.

FIG. 16 shows an example anti-aliasing copy out buffering operation used to copy out the contents of embedded frame buffer 702 into an external frame buffer within main memory 115. In this example, the embedded frame buffer 702 is organized into tiles that are 32 pixels wide by 32 pixels high. Copying out is done a tile-by-tile basis. However, as shown in the shaded region of FIG. 17, the copy out operation needs one pixel from the immediately uppermost adjacent neighboring tile and one pixel from the immediately lowermost adjacent neighboring tile in order to perform the vertical anti-aliasing filter function described above. Therefore, in the preferred embodiment, the copy out operation is performed by reading out a 34-pixel high by 32-pixel wide tile. In the example embodiment (which also includes a vertical scaling capability), copying is performed first in the y direction and then in the x direction to facilitate vertical zooming.

Figure 18:
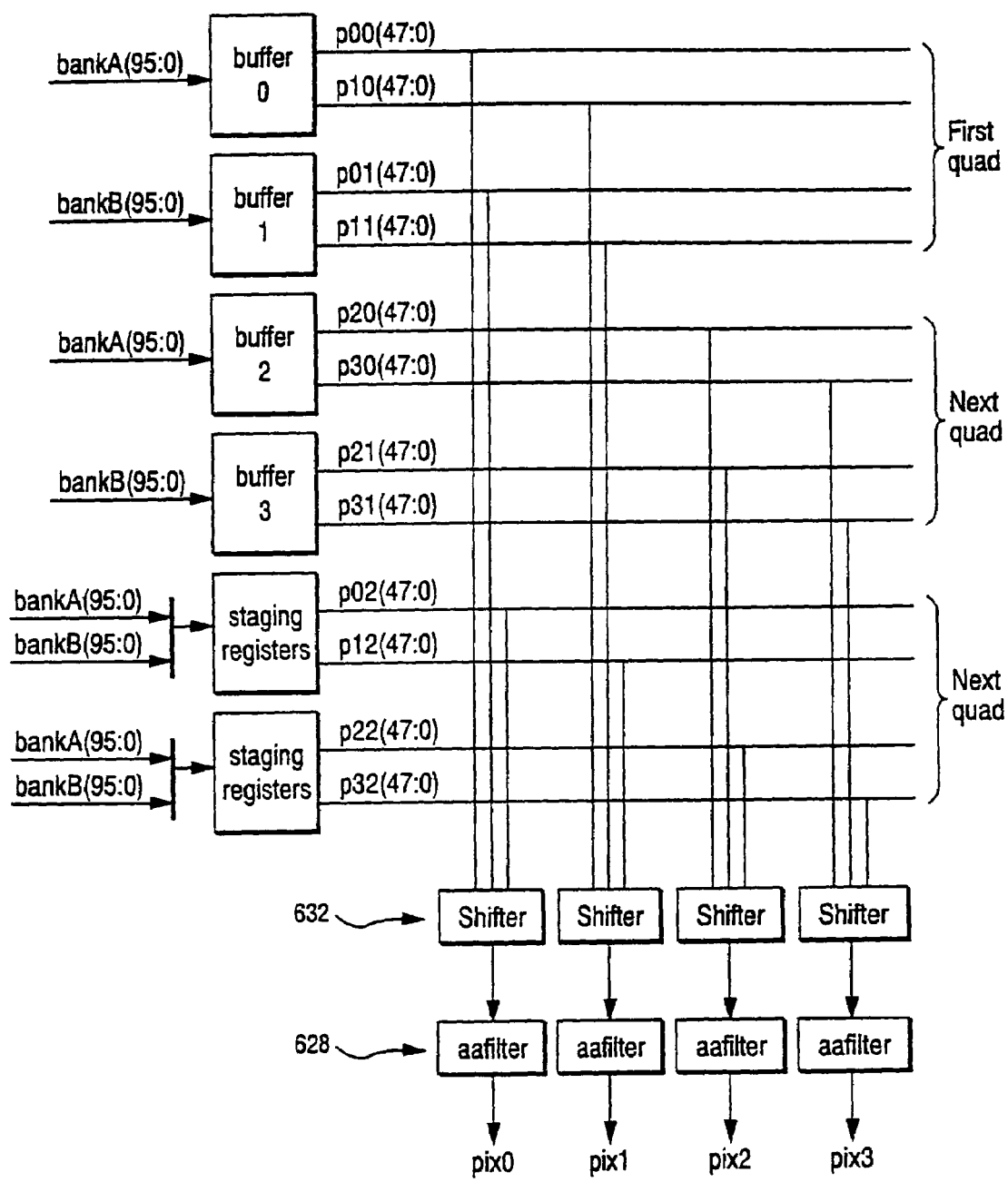
FIG. 18 shows a block diagram of the anti-aliasing buffering used in accordance with a preferred embodiment of the instant invention.

In order to avoid the use of full line buffers, the copy operation uses anti-aliasing (AA) buffering, wherein the copy is performed in strips of 32 pixels wide (X axis). The data-path for the strip-buffers in this exemplary AA buffering is shown in the block diagram of FIG. 18. For each strip, two extra pixels are read in the left and right, for a total buffer size of 36. Data from two scan-lines are stored in four buffers in the following order:

buffer0 holds horizontal pixel pairs with x[1]=0, y[0]=0 (bankA)

buffer1 holds horizontal pixel pairs with x[1]=0, y[0]=1 (bankB)

buffer0 holds horizontal pixel pairs with x[1]=1, y[0]=0 (bankA)

buffer1 holds horizontal pixel pairs with x[1]=1, y[0]=1 (bankB)

The third scan-line comes from live data from the embedded frame buffer. The shifters 632 provide RGB pixel data from the separate lines to the respective AA filter 628.

Another aspect to anti-aliasing in the preferred embodiment is that the maximum screen resolution that can be supported in one pass drops down to 640 pixels by 288 pixels. If higher display resolution is required, then due to the size limitation of the embedded frame buffer 702, multiple passes through the scene may need to be performed. At the end of each pass, the image is copied out into main memory. For example, a scene can be rendered in two passes by rendering the top half of the scene into the embedded frame buffer; copying out the top half of the scene into the top half of an external frame buffer; rendering the bottom half of the scene into the embedded frame buffer; and copying out the bottom half of the scene into the external frame buffer before finally displaying the entire scene from the external frame buffer. Such a multiple-pass operation is slower than a single-pass operation but reduces the amount of embedded frame buffer required on chip. As memory becomes cheaper in the future, it will be possible to incorporate additional embedded frame buffer memory (e.g., four megabytes, eight megabytes or more) on chip such that even high resolution images may be rendered and copied out in a single pass.

Example De-Flickering Filtering During Copy Out

The same vertical filter can be used during copy-out in a non-anti-aliasing mode to achieve a de-flickering function using point sampled pixels. De-flickering is typically used to solve two problems: 1) to eliminate flickering of thin one-pixel tall horizontal lines for interlaced video display (a one pixel tall horizontal line will flicker at 30 Hz as the TV interlaced video shows this line every other field); and 2) to provide simple anti-aliasing by rendering, for example, at 60 Hz 480 lines in the frame buffer and deflickering to 240 lines for interlaced display. This is basically 2-sample super-sampling.

Figure 19:
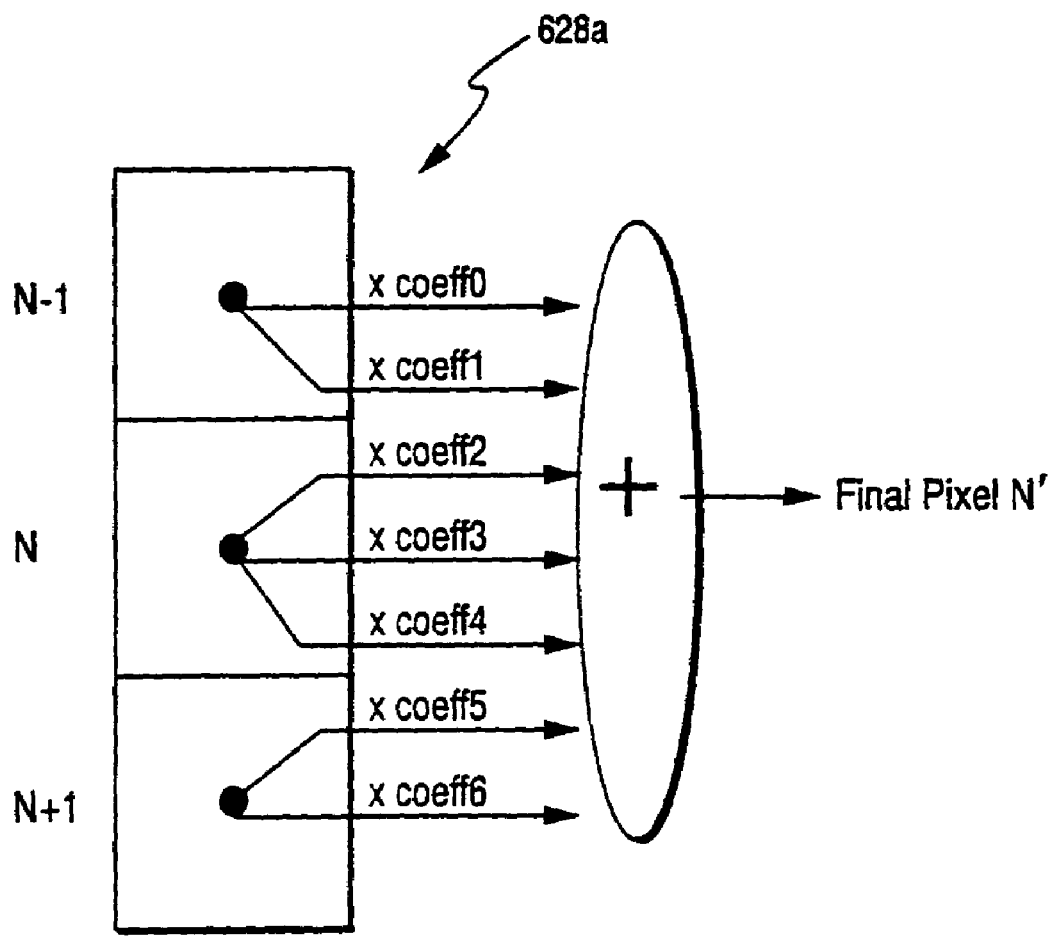
FIG. 19 shows the filter of FIG. 14 used in a non-anti-aliasing mode and which reduces flickering in accordance with the instant invention.

In this example of the non-anti-aliasing mode (de-flickering mode), the sample patterns are not programmable. Thus, in this example, the hardware uses only the center of the pixel as the sample locations. Thus, the programmable super-sample locations are ignored in this exemplary mode. An example blending filter 628*a* for de-flickering is shown in FIG. 19. The weighting coefficients (coeff0–coeff6) are programmable and can correspond to the weightings (W0–W6) in the anti-aliasing filter shown in FIG. 14. As shown in FIG. 19, the vertical filter 628*a* in de-flickering mode uses three inputs (center only) from the current pixel and two inputs (center only) from each of the two vertically neighboring pixels (N−1 and N+1), thereby obtaining the seven values for the filtering operation. The programmable weighting coefficients (coeff0–coeff6) are applied to the seven samples, and then the results are added to obtain the final pixel color (N'). For de-flickering, coeff0 and coeff1 are preferably set to the same value, coeff2, coeff3 and coeff4 are preferably set to the same value, and coeff5 and coeff6 are preferably set to the same value. These values may be defined in the same manner as W0–W6 described above with respect to the anti-aliasing filter 628. It is noted that if it is desired to have N' be the same as N, coeff0, coeff1, coeff5 and coeff6 can be set to zero, and the remaining weights (coeff2, coeff3 and coeff4) can be set so that they total one (1). This will enable the filter to output a value of N' that is the same as the value of the single sample in pixel N.

It is noted that the location of the point sample in each pixel may be programmable in another embodiment of the invention. In other words, the invention is not limited to using the center of the pixel as the point sampled location. This location may be set by hardware or programmable so as to vary from one pixel to the next in order to constitute a specific sampling pattern between adjacent pixels, as described above with respect to the supersampling or anti-aliasing mode. For example, a specific pattern for the point sample locations may be set on a quad-by-quad basis or otherwise in order to improve the anti-aliasing achieved in this point sampled embodiment. As explained in detail above for the anti-aliasing embodiment, the extent of the reconstruction filter (deflicker filter) can then be increased in the vertical, horizontal or both direction(s), to greater than 1×1 for the purpose of improving anti-aliasing. Thus, by using a particular point sample location pattern (i.e. jittering between pixels) and a particular filter configuration that share some point samples from neighboring pixels, better anti-aliasing can be achieved in accordance with the instant invention.

Figure 20:
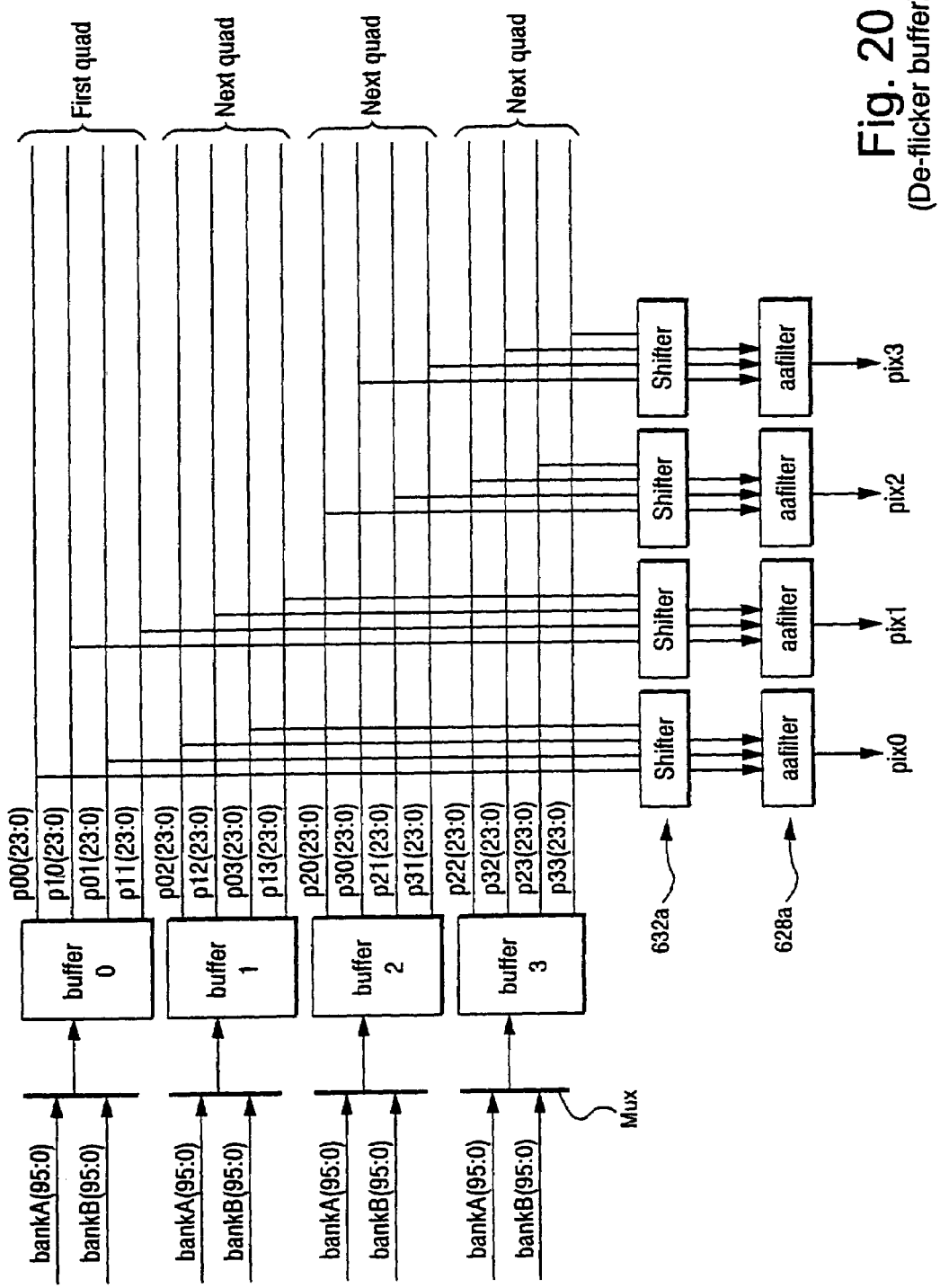
FIG. 20 show a block diagram of the de-flickering buffering used in accordance with a preferred embodiment of the instant invention.

De-flickering can be optionally performed as described above to convert a frame to a field. Preferably, the de-flickering filter and AA filter are shared. The four strip buffers used in the AA data path (see FIG. 17) are also used to store quad strips. An exemplary block diagram of the data-path for de-flicker buffering is shown in FIG. 20. The shifter section 632*a* provides the three RGB pixel data from the three separate lines to the AA-filter. This is a three-tap filter with programmable coefficients.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 21A:
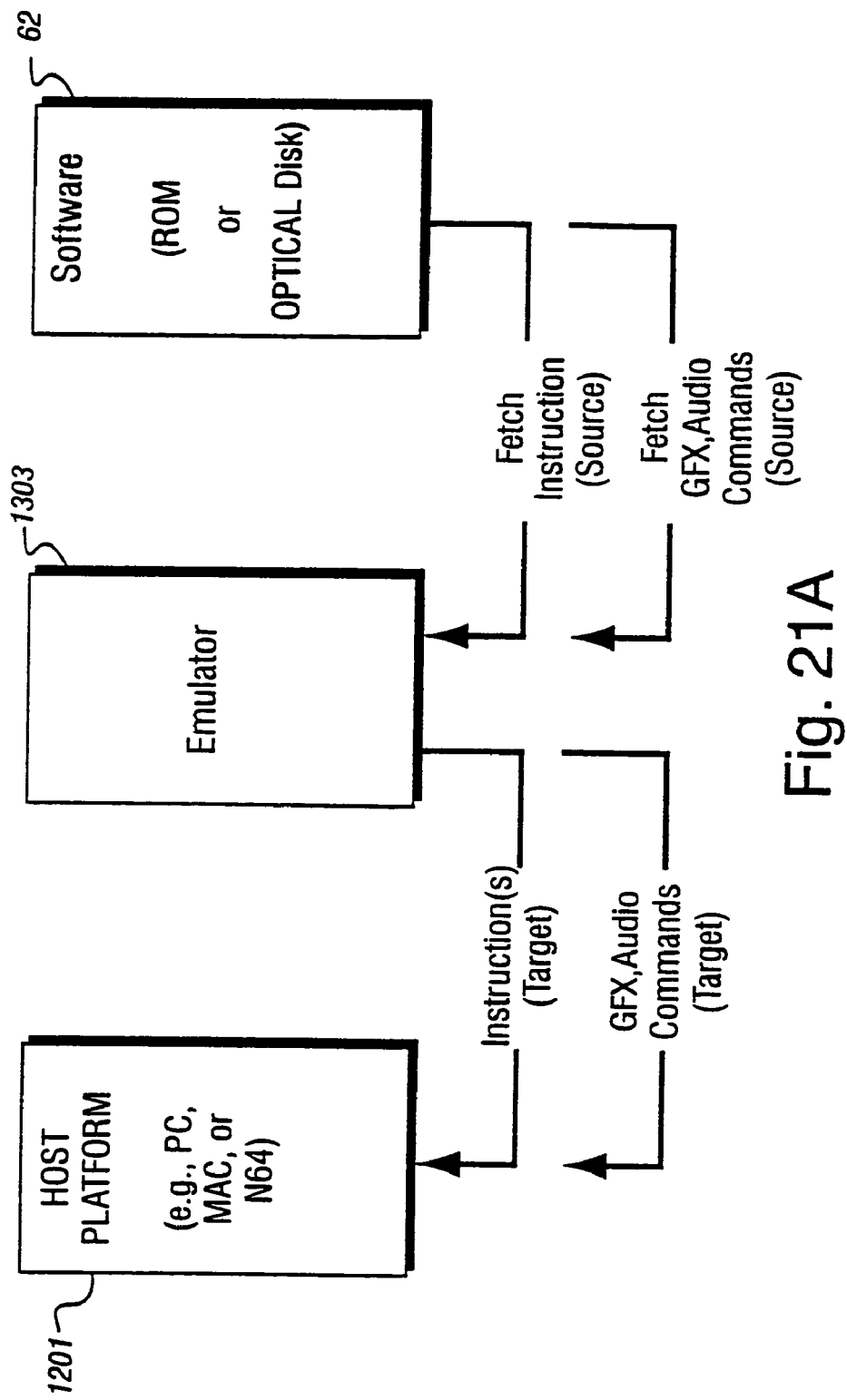

FIG. 21A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

One example way to implement anti-aliasing on an emulator is not to implement it at all; in other words, an emulator might entirely ignore or "stub" calls directed to turning anti-aliasing on and off. Another possibility is to activate the same or different form of anti-aliasing in response to activation of the anti-aliasing API calls discussed above. An emulator running on a standard personal computer with a standard graphics card may not have an embedded frame buffer or the hardware-based anti-aliasing filtering arrangements and the particular frame buffer formats discussed above. Accordingly, anti-aliasing could be performed in an entirely different way—or it could be performed in essentially the same way under software control where the software operates on the contents of the standard frame buffer to provide the filtering discussed above. Certain advanced graphics cards supposedly support anti-aliasing in hardware, but at the present time, the more usual approach is to perform anti-aliasing under software control. However, as standard graphics cards become more advanced and anti-aliasing support in hardware becomes more available, an emulator might use a different anti-aliasing approach to emulate the anti-aliasing called for by an application written to run on the system shown in FIG. 1.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 21 illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 11158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. In a graphics system, a method of providing full-scene anti-aliasing, comprising the steps of:
   (a) defining three super-sampled color data locations associated with a pixel for each of a plurality of neighboring pixels;
   (b) blending color data corresponding to each of the three super-sampled color data locations within a first pixel with color data from two super-sampled color locations of a second pixel located immediately above said first pixel and with color data from two super-sampled color locations of a third pixel located immediately below said first pixel; and
   (c) displaying said first pixel having a color corresponding to the blending.

2. The method of claim 1, wherein the blending step (b) includes assigning color blending weights for at least the super-sampled color data locations used in blending color data, and computing a weighted average of blended color data based at least in part on assigned weights.

3. An arrangement that anti-aliases super-sampled pixels comprising:
   an embedded frame buffer storing three super-samples from each pixel of a pixel array, each super-sample having a corresponding color value; and
   a one-dimensional color data blending filter that blends the three super-sample color values of a pixel with super-sample color values from vertically adjacent neighboring pixels while information within the embedded frame buffer is being transferred to an external frame buffer.

4. The arrangement of claim 3, wherein the embedded frame buffer stores no more than three super-sample locations within each pixel.

5. The arrangement of claim 3, wherein the filter blends super-sample color values corresponding to three vertically aligned pixels to produce a screen pixel output.

* * * * *